(12) United States Patent
Okamura et al.

(10) Patent No.: US 10,084,379 B2
(45) Date of Patent: *Sep. 25, 2018

(54) BOOST CONVERTER CONTROL APPARATUS

(71) Applicant: TOYOTA JIDOSHA KABUSHIKI KAISHA, Toyota-shi, Aichi-ken (JP)

(72) Inventors: Masaki Okamura, Toyota (JP); Naoyoshi Takamatsu, Shizuoka-ken (JP); Hideto Hanada, Okazaki (JP); Kenji Yamada, Komaki (JP); Kosuke Hirano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 274 days.

This patent is subject to a terminal disclaimer.

(21) Appl. No.: 14/441,938

(22) PCT Filed: Nov. 13, 2012

(86) PCT No.: PCT/JP2012/079349
§ 371 (c)(1),
(2) Date: May 11, 2015

(87) PCT Pub. No.: WO2014/076749
PCT Pub. Date: May 22, 2014

(65) Prior Publication Data
US 2015/0280565 A1 Oct. 1, 2015

(51) Int. Cl.
*H02M 3/158* (2006.01)
*B60L 11/08* (2006.01)
(Continued)

(52) U.S. Cl.
CPC ........... *H02M 3/158* (2013.01); *B60L 11/005* (2013.01); *B60L 11/08* (2013.01); *B60L 11/123* (2013.01);
(Continued)

(58) Field of Classification Search
None
See application file for complete search history.

(56) References Cited

U.S. PATENT DOCUMENTS

| 5,770,940 A | 6/1998 | Goder |
| 2007/0080675 A1 | 4/2007 | Gray et al. |

(Continued)

FOREIGN PATENT DOCUMENTS

| DE | 102008018885 A1 | 10/2009 |
| DE | 112008003489 T5 | 11/2010 |

(Continued)

OTHER PUBLICATIONS

USPTO, Non-Final Office Action in U.S. Appl. No. 14/440,415, dated Apr. 20, 2017, 8 pages.
(Continued)

*Primary Examiner* — Rexford Barnie
*Assistant Examiner* — Swarna N Chowdhuri
(74) *Attorney, Agent, or Firm* — Hunton Andrews Kurth LLP

(57) ABSTRACT

The present invention minimizes system loss during execution of intermittent boosting. A boost converter control apparatus has: a target value setting device for setting a target value of output voltage that minimizes a loss of a power supply system including a DC power supply, a boost converter, and a loading apparatus; an intermittent controlling device for executing an intermittent process of boost control in such a manner that the output voltage is maintained in a range including the set target value; an average value calculating device for calculating an average value of the output voltage in an execution period of the intermittent process; and a target value correcting device for correcting the set target value to reduce a deviation between the calculated average value and the set target value.

9 Claims, 14 Drawing Sheets

(51) Int. Cl.
  *H02M 3/156*  (2006.01)
  *B60L 11/00*  (2006.01)
  *B60L 11/12*  (2006.01)
  *B60L 11/14*  (2006.01)
  *B60L 15/00*  (2006.01)
  *B60L 15/20*  (2006.01)
  *H02M 1/00*  (2006.01)

(52) U.S. Cl.
  CPC ............ *B60L 11/14* (2013.01); *B60L 15/007* (2013.01); *B60L 15/20* (2013.01); *H02M 3/156* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/547* (2013.01); *B60L 2240/549* (2013.01); *B60L 2250/26* (2013.01); *B60L 2260/26* (2013.01); *H02M 2001/0003* (2013.01); *H02M 2001/007* (2013.01); *Y02T 10/6217* (2013.01); *Y02T 10/645* (2013.01); *Y02T 10/7022* (2013.01); *Y02T 10/7077* (2013.01); *Y02T 10/7241* (2013.01); *Y02T 10/7275* (2013.01)

(56) References Cited

U.S. PATENT DOCUMENTS

| | | |
|---|---|---|
| 2007/0278986 A1 | 12/2007 | Okamura |
| 2008/0143286 A1* | 6/2008 | Egami .................. B60K 6/365 318/432 |
| 2009/0033302 A1 | 2/2009 | Hariu |
| 2009/0206660 A1 | 8/2009 | Makita et al. |
| 2009/0279337 A1* | 11/2009 | Hamatani ................ B60L 3/12 363/132 |
| 2010/0039836 A1 | 2/2010 | Gong et al. |
| 2010/0209792 A1 | 8/2010 | Umayahara et al. |
| 2010/0316922 A1 | 12/2010 | Hamada et al. |
| 2011/0062934 A1 | 3/2011 | Wolf |
| 2011/0193539 A1 | 8/2011 | Schmidt et al. |
| 2012/0043900 A1 | 2/2012 | Chitta et al. |
| 2012/0069613 A1 | 3/2012 | Nakagawa |
| 2012/0091981 A1 | 4/2012 | Komiya |
| 2013/0187583 A1 | 7/2013 | Iwatsuki et al. |
| 2015/0303798 A1 | 10/2015 | Okamura et al. |

FOREIGN PATENT DOCUMENTS

| | | |
|---|---|---|
| JP | H10-127094 A | 5/1998 |
| JP | 2006-353032 A | 12/2006 |
| JP | 2007-325351 A | 12/2007 |
| JP | 2010-247725 A | 11/2010 |
| JP | 2011-015603 A | 1/2011 |

OTHER PUBLICATIONS

USPTO, Notice of Allowance in U.S. Appl. No. 14/440,415, dated Oct. 12, 2017, 8 pages.

Office Action dated Oct. 6, 2016, in U.S. Appl. No. 14/140,415.

* cited by examiner

BOOST CONVERTER CONTROL APPARATUS

CROSS-REFERENCE TO RELATED APPLICATION

This is a national phase application based on the PCT International Patent Application No. PCT/JP2012/079349 filed Nov. 13, 2012, the entire contents of which are incorporated herein by reference.

TECHNICAL FIELD

The present invention relates to a boost converter control apparatus configured to control a boost converter, for example, in a power supply system for a vehicle.

BACKGROUND ART

As an apparatus related to the control of the boost converter in the power supply system for the vehicle, there is an electric motor drive control system disclosed in a Patent Literature 1.

According to the system disclosed in the Patent Literature 1, required minimum voltage VHmin of the boost converter is calculated on the basis of torque command values of a plurality of motor generators, which are loading apparatuses. A plurality of candidate values of output voltage of the boost converter are determined in a voltage range from the required minimum voltage VHmin to maximum output voltage VHmax of the boost converter. Moreover, in the system disclosed in the Patent Literature 1, a loss of an entire boost system including a battery, the boost converter, and the motor generators is estimated for each of the plurality of candidate values. A target value of the output voltage VH of the boost converter is set to a candidate value that minimizes the estimated loss. The Patent Literature 1 suggests that the system can minimize the power loss of the entire boost system.

Patent Literature 2 discloses an apparatus configured to prevent overshoot of a direct current (DC) voltage value on a motor drive apparatus using pulse amplitude modulation (PAM) control. This apparatus is capable of preventing the overshoot of the DC voltage value by reducing an increase value of a DC voltage command value if a DC voltage detection value approaches a predetermined value in a certain range.

Moreover, Patent Literature 3 discloses a voltage varying apparatus configured to vary a change ratio of the voltage command value on the basis of magnitude of the voltage command value. This apparatus is capable of preventing the overshoot of the output voltage by making the change ratio of the voltage command value smaller than a previous value if the voltage command value exceeds a threshold value.

Moreover, Patent Literature 4 discloses a control apparatus for a load drive system in which the output voltage of the boost converter can be kept even if operation of the boost converter is stopped in an extremely low load state.

According to this apparatus, switching operation of a converter is stopped when total load power, which is the sum of load powers of a plurality of loads, is a value in a predetermined range including zero. Moreover, when the total load power is the value in the predetermined range, a command that is outputted to any of load drive control units is corrected such that an absolute value of a deviation between a command value and the output voltage of the boost converter is reduced. Thus, the output voltage of the boost converter can be kept even if the operation of the converter is stopped in the extremely low load state. In addition, the loss of the boost converter can be reduced because the boost converter can be stopped in the extremely low load state or a no-load state.

CITATION LIST

Patent Literature

Patent Literature 1: Japanese Patent Application Laid Open No. 2007-325351
Patent Literature 2: Japanese Patent Application Laid Open No. Hei 10-127094
Patent Literature 3: Japanese Patent Application Laid Open No. 2006-353032
Patent Literature 4: Japanese Patent Application Laid Open No. 2011-015603

SUMMARY OF INVENTION

Technical Problem

Recently, switching performance of the boost converter has dramatically improved, and intermittent boosting of the boost converter, which cannot be conventionally realized, can be also realized. The intermittent boosting namely means that a boosting operation and a boosting stop operation are actively repeated. If the intermittent boosting is executed, a boost loss of the boost converter becomes zero in a boosting stop period. Thus, the loss of the entire system including a power supply, the boost converter, and the loading apparatus (hereinafter, it is referred to as a "system loss" as occasion demands) can be significantly reduced.

By the way, if the intermittent boosting is executed, the output voltage VH of the boost converter increases or decreases according to a drive state of the loading apparatus in the boosting stop period. In other words, the output voltage VH varies.

Thus, if a control method disclosed in the Patent Literature 1 is applied to the boost converter in which the intermittent boosting is executed, even if the target value of the output voltage VH of the boost converter that can minimize the system loss is determined, the output voltage VH does not necessarily converge to the target value that can minimize the system loss.

A conventional configuration in which the boosting is always executed and a configuration in which the intermittent boosting is executed are totally different in behavior of the output voltage VH, which is premised.

Therefore, in a conventional technical concept including what disclosed in the Patent Literatures described above, the system loss cannot be minimized if the intermittent boosting is executed by the boost converter.

The Patent Literature 4 apparently discloses a technical concept similar to the intermittent boosting; however, the technical concept disclosed in the Patent Literature 4 and the aforementioned intermittent boosting are, in fact, basically totally different.

In other words, in the apparatus disclosed in the Patent Literature 4, a condition for stopping the boost converter is that the output voltage VH (referred to as "secondary voltage V2" in the Patent Literature) of the boost converter does not decrease during the stop of the boost converter. In other words, this apparatus cannot stop the boost converter under a condition that the output voltage VH varies or cannot help varying. Except for an ideal no-load condition, for example, as described in a paragraph [0005] in the Patent Literature 4, in general, a low load variation occurs even under a condition which is defined as no load. In this apparatus, a change in the output voltage VH is suppressed by correcting command torque of the loading apparatus so as to suppress the load variation.

However, torque required for the loading apparatus is not related to circumstances on the boost converter side associated with the loss reduction. If actual output torque of the loading apparatus significantly deviates from a required value when the torque required for the loading apparatus is corrected, the loading apparatus hardly plays an original role. In particular, in a case where the loading apparatus is an electric motor for driving a vehicle, if torque supplied to a drive shaft connected to an axle shaft deviates from the required torque, power performance and drivability are likely significantly influenced. Therefore, in this apparatus, as consistently described in the Patent Literature, the control is effective only in a load region with the extremely low load (or in the predetermined range in which the total load power includes zero).

As described above, in the technical concept disclosed in the Patent Literature 4, it is not considered that the output voltage VH increases or decreases in the boosting stop period. Therefore, such a problem that the system loss is not minimized does not originally occur.

In a configuration in which the loading apparatus includes an electric motor and a generator, it is not impossible to make an input and output of the power balance by using power which is generated by the generator for power-running drive of the electric motor. However, power consumption of the load has to be estimated on the basis of a voltage value and a current value, and includes errors. It is therefore not easy to accurately make the input and output of the power balance between the electric motor and the generator. After all, such control does not sufficiently function, except in a low load region in which an accuracy for estimating the power is easily secured. If such control is executed in a high load region, the aforementioned system loss easily increases even if the variation in the output voltage VH of the boost converter can be suppressed.

The present invention is invented in view of the aforementioned circumstances, and it is therefore an object of the present invention to provide a boost converter control apparatus configured to minimize the system loss during the execution of the intermittent boosting.

Solution to Problem

In order to solve the above problem, a boost converter control apparatus of the present invention is a boost converter control apparatus which is configured to control a boost converter in a power supply system, the power supply system has: a DC (direct current) power supply having power supply voltage VB; the boost converter including a switching device, the boost converter being configured to boost and output the power supply voltage VB to a loading apparatus by predetermined boost control including switching of a switching state of the switching device; and a voltage detecting device for detecting output voltage VH of the boost converter, the boost converter control apparatus has: a target value setting device for setting a target value of the output voltage VH that minimizes a loss of the power supply system including the DC power supply, the boost converter, and the loading apparatus; an intermittent controlling device for executing an intermittent process of the boost control in such a manner that the output voltage VH is maintained in a range including the target value which is set when the boost control is executed immediately before, on the basis of the detected output voltage VH; an average value calculating device for calculating an average value of the output voltage VH in an execution period of the intermittent process; and a target value correcting device for correcting the set target value to reduce a deviation between the calculated average value and the set target value (Claim 1).

The boost control means a control for boosting the power supply voltage VB to the target value of the output voltage VH according to a requirement from the loading apparatus side (i.e. a voltage command value) by the control of the switching state of the boots converter.

In the boost converter control apparatus of the present invention, the target value of the output voltage VH of the boost converter is set to minimize the system loss (power loss of the entire power supply system including the DC power supply, the boost converter, and the loading apparatus). Such a method of setting the target value is known, as disclosed in the aforementioned background art.

Incidentally, the term "minimum (to minimize)" of the present invention does not have a unique or unambiguous concept. For example, the term "minimum" of the present invention can include not only being strictly minimum but also to belong to a division with the least loss when the value of the system loss is divided in accordance with a certain reference, being minimum among a plurality of candidate values which are selected or set arbitrarily or in accordance with a predetermined reference, or the like.

If the boost control is continuously executed, the output voltage VH converges to the target value in a stationary state. Therefore, if the target value is set to minimize the system loss, the system loss can be minimized in a stationary state.

Moreover, according to the boost converter control apparatus of the present invention, the intermittent process of the boost control (hereinafter it is expressed as the "intermittent boosting" as occasion demands) is executed. The intermittent boosting is a process in which the stop of the boost control and the restart of the boost control (i.e. cancelation of the stop) are repeated, as described above. A boosting operation of the boost converter results in a boost loss caused by switching ripple of the switching device or the like, but the boost loss is zero in a period in which the boost control is stopped. Therefore, the execution of the intermittent boosting allows the system loss to be reduced.

The stop of the boost control in the intermittent boosting does not mean the stop of individual operation of each of switching elements that constitute the switching device, which occurs as occasion demands in the boost control, but means the stop of the boosting operation itself of the boost converter, i.e. shutdown. In general control of the boost converter of this type, the switching state of the switching element is changed (switched) every time a carrier signal, which is a triangular wave, matches a duty signal corresponding to boost command voltage. Here, if the switching device includes one switching element (e.g. a one-arm boost converter corresponds to this case), the switching device can be regarded as being temporarily fully stopped at timing at which the switching from ON to OFF is executed; however, such a full stop is merely a full stop that necessarily occurs as a part of the boost control, and is different in meaning from the stop of the boost control in the present invention.

Incidentally, a technical concept in which, instead of the intermittent execution of the boost control, the stop of the boost control is maintained as long as possible is wellknown as described in the above described Citation List (e.g. the Patent Literature 4). In other words, in this case, the output voltage VH is maintained by the correction of the drive condition on the loading apparatus side, although the output voltage VH originally increases or decreases on the basis of a drive condition of the loading apparatus wen the boost converter is in a stop state. Even this technical concept is the same in that the boost control of the boost converter is stopped.

However, the technical concept which considers only the loading apparatus side without allowing the variation of the output voltage VH as described above, namely, the technical concept in which the stop of the boost control has a unique relation with the maintenance of the output voltage VH of the boost converter is unnatural and unreasonable. That is because the only way is to stop the boost control only in an extremely limited load region in which the output voltage VH does not originally vary or to ignore a load which is required for the loading apparatus (e.g. drive torque for driving a vehicle on which the power supply system can be mounted), in order to maintain the output voltage VH against the natural laws by which electric energy which is stored in the boost converter increases when the loading apparatus is in a power regenerative state and the electric energy decreases when the loading apparatus is in a power-running state.

In contrast, the intermittent boosting in the present invention is an intermittent measurement of the boost control which is executed under the condition where the variation of the output voltage VH is allowed in a preset range or in a range which is individually and specifically set at each time in accordance with a preset setting reference. In other words, the boost converter control apparatus of the present invention uses a technical concept which finds that an operating state of the boost converter can be used as a control element and positively uses the boost converter as a type of power control apparatus, on the basis of a recent dramatic improvement of switching performance of the switching device (e.g. switching frequency). Therefore, the boost control can be stopped without any problem even in such a load condition that the measurement only on the loading apparatus side cannot solve the problem. In comparison with the background art, a frequency at which the boost control is stopped is obviously higher and a period during which the boost control is stopped is obviously longer. It is therefore possible to appropriately reduce the system loss.

When the intermittent boosting is executed, the output voltage VH increases or decreases according to the drive state of the loading apparatus in the stop period of the boost control. Therefore, when the intermittent boosting is executed, the output voltage VH rarely converges to the target value in the stationary state. Thus, the intermittent boosting in the present invention is executed to maintain the output voltage VH in a predetermined range including the target value. The range in which the output voltage VH is to be maintained can include, for example, the following ranges (1) to (6). They can be also combined as occasion demands.

(1) a range on a higher voltage side than the power supply voltage VB;

(2) a range on a lower voltage side than withstand voltage of the boost converter;

(3) a range in which a deviation from the target value is within a predetermined value;

(4) a range in which a ratio to the target value is within a predetermined ratio;

(5) a range in which an increase amount of the loss which arises during load drive in comparison with the target value is within a predetermined value;

(6) a range in which an increase amount of the loss which arises during load drive in comparison with the target value is within a predetermined ratio.

In the intermittent boosting, the boost control is stopped, for example, when the output voltage VH reaches the target value in the boost control or when the output voltage VH converges to the target value with a certain degree of convergence error. The boost control is restarted, for example, when the detected output voltage VH reaches a boundary value of the range.

The intermittent boosting may be permitted under such a condition that a variation width of the output voltage VH is within a predetermined value. The variation width of the output voltage VH is a concept including a quantitative index of behavior of the output voltage VH over a certain period of time, and can include, for example, the following (1) to (3).

(1) an average value of the deviation between the target value and the output voltage VH in a certain period (2) a maximum value of the deviation between the target value and the output voltage VH in a certain period (3) a maximum value of a change amount of the output voltage VH in a certain period If the condition for permitting the start of the intermittent boosting is set as described above, for example, the intermittent boosting is prohibited when the target value significantly changes or in similar cases, and the system loss can be appropriately reduced while preventing a situation of large fluctuation of the output voltage VH of the boost converter or similar situations.

Moreover, when current flowing through the boost converter or the DC power supply (wherein the current can be both positive and negative values according to the drive condition of the loading apparatus) has a large absolute value, the output voltage VH changes relatively fast due to the stop of the boost converter. Therefore, if the aforementioned range is constant, the output voltage VH reaches the boundary value of the range in a relatively short time and thus the boost control is restarted. When the stop period of the boost control is reduced as described above, the increase amount of the boost loss between the restart of the boost control and the re-stop of the boost control sometimes becomes greater than the decrease amount of the boost loss caused by the stop of the boost control, and there is a possibility that an effect of the reduction of the system loss which is caused by the intermittent boosting is not obtained. In view of this point, it is also preferable to provide a current detecting device for detecting the current flowing through the boost converter or the DC power supply, and to start the intermittent boosting when the detected current value is within a predetermined value.

Moreover, when a change degree of the output of the DC power supply or the loading apparatus is large, the output voltage VH changes relatively fast due to the stop of the boost control. Therefore, when the aforementioned range is constant, the output voltage VH reaches the boundary value of the range in a relatively short time and thus the boost control is restarted. If the stop period of the boost control is reduced as described above, the increase amount of the boost loss between the restart of the boost control and the re-stop of the boost control sometimes becomes greater than the decrease amount of the boost loss caused by the stop of the boost control, and there is a possibility that an effect of the reduction of the system loss which is caused by the intermittent boosting is not obtained. In view of this point, it is also preferable to specify the change degree of the output of the DC power supply or the loading apparatus and to start the intermittent boosting when the specified change degree of the output is within a predetermined value.

By the way, when the output voltage VH increases in the stop period of the boost control (e.g. during regeneration), the output voltage VH varies between the target value and an upper limit value of the predetermined range, and thus, the effective output voltage VH becomes higher than the target value. On the other hand, when the output voltage VH decreases in the stop period of the boost control (e.g. during power running), the output voltage VH varies between the target value and a lower limit value of the predetermined range, and thus, the effective output voltage VH becomes lower than the target value. As a result, if the target value for minimizing the system loss is used for the intermittent boosting as it is, then, the effective output voltage VH deviates from the target value, and the system less relatively deteriorates, which is problematic.

In order to solve the problem, the boost converter control apparatus of the present invention is configured to correct the target value of the boost control to reduce the deviation between the set target value and the average value of the output voltage VH which is calculated by the average value calculating device. The "target value of the boost control" means the set target value when the correction is not executed, and means the corrected target value when the target value is corrected in the intermittent boosting.

Namely, when the output voltage VH increases in the stop period of the boost control, the average value of the output voltage VH becomes higher than the set target value, and thus, the target value of the boost control is corrected to decrease. On the other hand, when the output voltage VH decreases in the stop period of the boost control, the average value of the output voltage VH becomes lower than the set target value, and thus, the target value of the boost control is corrected to increase. The correction measurement which is constantly executed by the correcting device can make a state which is same as a state in which the output voltage VH is maintained at the original target value (i.e. the set target value) in the execution period of the intermittent boosting. As a result, in cooperation with the effect to reduce the system loss of the intermittent boosting described above, the system loss can be further reduced.

Incidentally, the average value of the output voltage VH is a value obtained by executing a proper averaging process on the output voltage VH in the execution period of the intermittent boosting, and various methods can be used as the averaging process. For example, the averaging process may be a general addition/averaging process which adds the value of the output voltage VH detected in each of particular sampling cycles and divides an addition value with a length of sampling period. Alternatively, when the value of the output voltage VH detected does not have uniform reliability, the averaging process may be an addition/averaging process which is executed after placing higher weight on a more-reliable sampling value.

Incidentally, as described above, in the background art described in the Patent Literature 4, the output voltage VH does not vary in the stop period of the boost control. Therefore, there is no such a problem to be solved by the present invention that the output voltage VH deviates from the target value that can minimize the system loss. Necessarily, it is hard to find technical meaning of the calculation of the average value of the output voltage from the background art.

One aspect of the boost converter of the present invention further has a range setting device for setting the range in such a manner that a deviation between the set or corrected target value and an upper limit value of the range decreases as the set or corrected target value increases (Claim 2).

As described above, the output voltage VH increases or decreases according to a state (or load state) of the loading apparatus at that time point, in the stop period of the boost control.

By the way, the boost converter has a withstand voltage value as physical specification, and it is not preferable that the output voltage VH exceeds the withstand voltage value. Therefore, if the output voltage VH increases, it is desired to set the range in which the output voltage VH is to be maintained such that the output voltage VH does not exceed the withstand voltage value. On the other hand, the range is set on the basis of the target value of the output voltage VH for minimizing the system loss or the target value which is corrected during the execution of the intermittent boosting. The withstand voltage value is a fixed value, and it is not hard to set the upper limit value of the range to a value on a lower voltage side than the withstand voltage value.

However, if the boost control (in this case, it is a control of reducing the output voltage VH in spite of the boost control) is restarted after the output voltage VH reaches the upper limit value of the range, the output voltage VH often transiently overshoots. If no measurement is taken, the output voltage VH exceeds the upper limit value of the range due to the overshoot, and as a result, there is a possibility that the output voltage VH exceeds the withstand voltage value.

According to this aspect, the range is set to reduce the deviation between the target value and the upper limit value of the range, in a binary, stepwise, or continuous manner, as the target value increases (i.e. as the target value approaches the withstand voltage value). Therefore, it is prevented that the output voltage VH overshoots and exceeds the withstand voltage value, and an opportunity to execute the intermittent boosting is ensured. The effect is significant in comparison with, for example, a measurement of prohibiting the intermittent boosting when the target value is greater than or equal to a threshold value or similar measures.

In another aspect of the boost converter of the present invention, the average value calculating device calculates the average value on the basis of the detected output voltage VH in at least one unit intermittent process, wherein the unit intermittent process is a process corresponding to a period including an execution period and a stop period of the boost control, which are continuous to each other, in the intermittent process of the boost control (Claim 3).

In the intermittent process of the boost control, the execution and the stop of the boost control are repeated in order as follows; the boost control is stopped, then, the boost control is restarted when the output voltage VH reaches the upper limit value or the lower limit value of the range due to the increase or decrease in the output voltage VH, and then, the boost control is stopped again when the output voltage VH reaches the target value or converges to the target value or the like and thus a stop condition is satisfied.

Now, if the process corresponding to the period including the execution period and the stop period of the boost control, which are continuous to each other in time series, in the intermittent process of the boost control is defined as the unit intermittent process, the intermittent boosting is realized by repeating the unit intermittent process.

Therefore, when the average value of the output voltage VH is calculated in the unit intermittent process, the deviation between the set target value and the average value can be used meaningfully for the correction of the target value of the boost control.

The "period including the execution period and the stop period of the boost control" conceptually includes a period from a stop time point of the boost control to a re-stop time point of the boost control through the restart of the boost control, and a period from a start time point of the boost control to a restart time point of the boost control through the stop of the boost control.

Incidentally, in this aspect, the power supply system further has a current detecting device for detecting current which flows through the DC power supply or the boost converter, and the boost converter control apparatus further has a current correcting device for correcting the detected current in the stop period of the boost control in the one unit intermittent (Claim 4).

The current flowing through the DC power supply or the boost converter (wherein the current can be both positive and negative values according to the drive condition of the loading apparatus) is detected by the current detecting device such as, for example, a current sensor. The absolute value of the current becomes larger as the output voltage VH changes faster due to the stop of the boost control. Therefore, when the aforementioned range is constant, the output voltage VH reaches the boundary value of the range in a relatively short time and thus the boost control is restarted. If the stop period of the boost control is reduced, the increase amount of the boost loss between the restart of the boost control and the re-stop of the boost control sometimes becomes greater than the decrease amount of the boost loss caused by the stop of the boost control, and the effect of the reduction of the system loss which is caused by the intermittent boosting is not sufficiently obtained. Therefore, the intermittent boosting is desirably executed when the detected current value is within a predetermined value. As described above, since magnitude of the current correlates with the determination of whether or not to execute the intermittent boosting, the current detected by the current detecting device requires accuracy.

Here, the aforementioned unit intermittent process of the intermittent boosting always includes the stop period of the boost control. In the stop period of the boost control, theoretically, no current flows through the DC power supply and the boost converter. It is therefore possible to easily execute the correction of the detected current (in other words, calibration of the current detecting device). In particular, the stop period of the boost control is a period that necessarily appears during the execution of the intermittent boosting, and it is thus not necessary to stop the boost control in order to correct the detected current, which is reasonable and efficient.

In another aspect of the boost converter of the present invention, the target value correcting device (1) corrects the set target value by adding a value that is less than or equal to the deviation between the calculated average value and the set target value to the set target value when the average value which is previously calculated by the average value calculating device is less than the set target value, and (2) corrects the set target value by subtracting the value that is less than or equal to the deviation between the calculated average value and the set target value from the set target value when the average value which is previously calculated by the average value calculating device is greater than the set target value (Claim 5).

According to this aspect, it is possible to realize accurate correction in response to actual situations by using the previously calculated average value for the correction of the latest target value, and it is therefore possible to effectively reduce the system loss. The term, previously or previous, desirably means the most recent past during a period when the latest boost control is executed.

In another aspect of the boost converter of the present invention, the intermittent controlling device starts the intermittent process of the boost control when a variation width of the output voltage VH is within a predetermined value (Claim 6).

According to this aspect, the intermittent process is permitted if the variation width of the output voltage VH is within the predetermined value. The variation width of the output voltage VH is a concept including a quantitative index of behavior of the output voltage VH over a certain period of time, and the definition is not unique. For example, the variation width of the output voltage VH may be the average value of the deviation between the target value (or boost command voltage) and the output voltage VH in the certain period. Alternatively, the variation width may be the maximum value of the deviation between the target value (or boost command voltage) and the output voltage VH in the certain period. Alternatively, the variation width may be the maximum value of the change amount of the output voltage VH in the certain period.

According to this aspect, the execution of the intermittent process is permitted when the output voltage VH is stabilized, and thus, the effect of the reduction of total loss can be expected. Moreover, when the target value (or boost command voltage) changes, the output voltage VH changes accordingly, and as a result, the variation width tends to increase. In other words, according to this aspect, the execution of the intermittent process can be easily prohibited on the basis of the setting of the predetermined value, when the target value changes, and thus the effect of the reduction of total loss can be expected In another aspect of the boost converter of the present invention, the power supply system is mounted on a vehicle (Claim 7).

The vehicle is preferable as a target to which the power supply system of the present invention is applied.

In another aspect of the boost converter of the present invention, the vehicle has, as a power source of the vehicle, at least one electrical rotating machine which is capable of performing power running and regeneration and which is the loading apparatus (Claim 8).

According to this aspect, the loading apparatus includes at least one electrical rotating machine for driving the vehicle. In particular, the electrical rotating machine is configured as a so-called motor generator that us capable of performing the power running and the regeneration. In other words, according to this aspect, the vehicle is a so-called hybrid vehicle or an electric vehicle (EV). In this type of vehicle, in particular, power saving is highly required, and there is a high practical benefit obtained from the boost converter control apparatus of the present invention.

In one aspect of the boost converter of the present invention in which the vehicle is provided with at least one electrical rotating machine, the vehicle is a hybrid vehicle having; an engine; a first electrical rotating machine which is capable of performing the power running and the regeneration and which is the loading apparatus; a differential mechanism having a plurality of rotating elements that can differentially rotate with each other, the plurality of rotating elements including a first rotating element which is coupled with the first electrical rotating machine, a second rotating element which is coupled with the engine, and a third rotating element which is coupled with a drive shaft connected to an axle shaft; and a second electrical rotating machine which is coupled with the drive shaft, which is capable of performing the power running and the regeneration and which is the loading apparatus, and the intermittent controlling device starts the intermittent process of the boost control when a difference between an input/output of power from/to the first and second electrical rotating machines is within a predetermined value in a case where one of the first and second electrical rotating machines is in a power-running state and the other is in a regenerative state (Claim 9).

According to this aspect, the vehicle is configured as the hybrid vehicle which performs power distribution (torque distribution) between the engine and the electrical rotating machines by using the differential mechanism including the rotating elements that can differentially rotate with each other. In this type of hybrid vehicle, the engine, the electrical rotating machine that is a reaction element to apply reaction force to the engine and the electrical rotating machine that is a drive element to input/output torque to/from the drive shaft cooperate with each other to supply required torque to the drive shaft.

Here, in this type of hybrid vehicle, in some cases, the first electrical rotating machine as the reaction element is in the power-running state and the second electrical rotating machine as the drive element is in the regenerative state, for example, during high-speed and low-load traveling or the like. Under such special circumstances, power exchange is performed between the first and the second electrical rotating machines, the difference between the input/output of the power from/to the first and second electrical rotating machines is near zero in view of an input/output loss during the power exchange. Therefore, when the intermittent boosting is executed under such circumstances, the output voltage VH changes slowly during the stop of the boost converter, and the stop period of the boost converter can be sufficiently increased.

Incidentally, in this control aspect, the first and second electrical rotating machines and the engine may be controlled to keep the difference between the input/output of the power in zero under such circumstances that the difference between the input/output of the power is almost kept in zero as described above. In other words, the difference between the input/output of the power may be controlled to be in more perfect state of equilibrium by using that the difference between the input/output of the power is almost kept in zero under such circumstance. In this case, as long as the circumstance continues, the boost converter can be stopped, ideally permanently.

The operation and other advantages of the present invention will become more apparent from embodiments and examples explained below.

DESCRIPTION OF EMBODIMENTS

<Embodiments of the Invention>

Hereinafter, various embodiments of the present invention will be explained with reference to the drawings.

<First Embodiment>

<Configuration of Embodiment>

Figure 1:
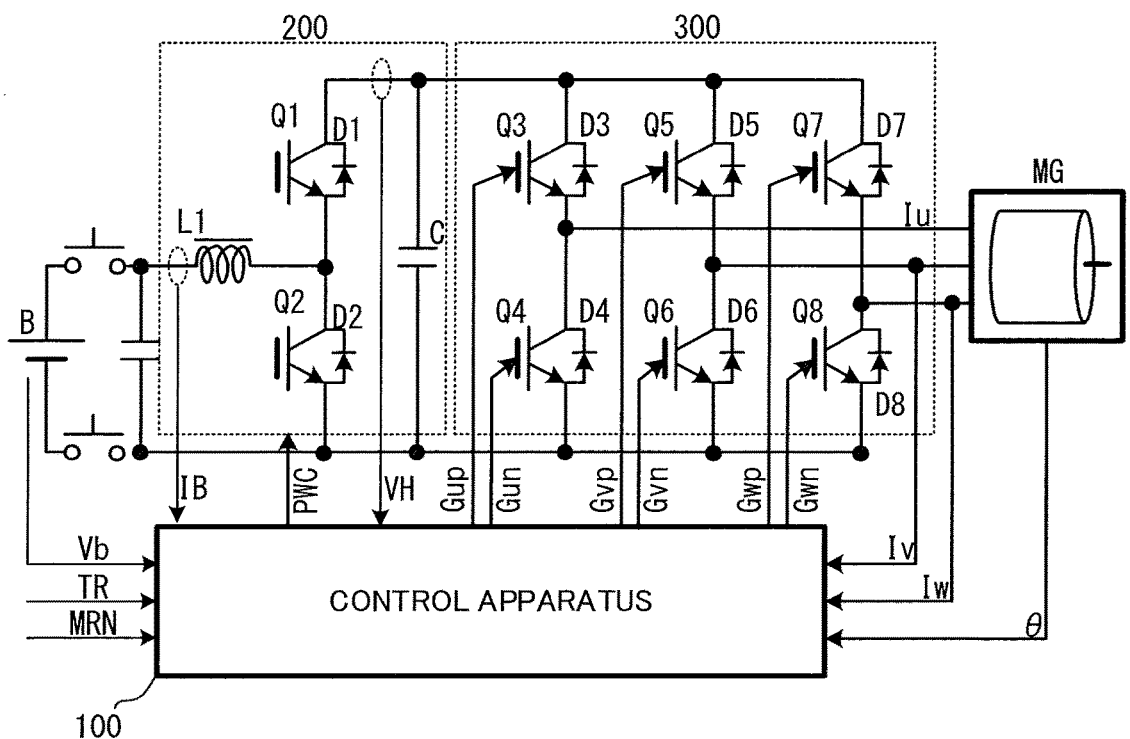
FIG. 1 is a system configuration diagram illustrating a motor drive system according to a first embodiment of the present invention.

Firstly, with reference to FIG. 1, a configuration of a motor drive system 10 according to this embodiment will be explained. FIG. 1 is a system configuration diagram conceptually illustrating the configuration of the motor drive system 10.

In FIG. 1, the motor drive system 10 is mounted on a not-illustrated vehicle, and is provided with a control apparatus 100, a boost converter 200, an inverter 300, and a direct current (DC) power supply B. The motor drive system 10 is configured to drive a motor generator MG as a loading apparatus, which is a source of a driving force for a vehicle, and is one example of the "power supply system" according to the present invention.

The control apparatus 100 is configured to control operation of the motor drive system 10, and is an electronic control unit, which is one example of the "boost converter control apparatus" according to the present invention. The control apparatus 100 is configured as a computer system, which can adopt forms of various electronic control apparatuses such as, for example, an electronic control unit (ECU), various controllers, microcomputer apparatuses, and the like. The control apparatus 100 is provided with a boost control unit 110 and an inverter control unit 120, which are not illustrated in FIG. 1, and a configuration of each of the control units will be described later. The control apparatus 100 is also provided with a storage apparatus such as a read only memory (ROM) and a random access memory (RAM).

The DC power supply B is a secondary battery unit with power supply voltage VB (e.g. 200 V) in which a plurality (e.g. several hundreds) of various secondary battery cells (e.g. cell voltage of several volts (V)) such as, for example, nickel hydrogen battery and a lithium ion battery are connected in series. As the DC power supply B, an electric double layer capacitor, a large-capacity condenser, a flywheel, or the like may be also used, instead of or in addition to this type of secondary battery.

The boost converter 200 is provided with a reactor L1, switching elements Q1 and Q2, diodes D1 and D2, and a capacitor C, and is a boost circuit as one example of the "boost converter" according to the present invention.

In the boost converter 200, one end of the reactor L1 is connected to a positive electrode line (whose reference numeral is omitted) which is connected to a positive electrode of the DC power supply B, and the other end is connected to a midpoint between the switching element Q1 and the switching element Q2, i.e. a connection point between an emitter terminal of the switching element Q1 and a collector terminal of the switching element Q2.

The switching elements Q1 and Q2 are connected in series between the above described positive electrode line and a negative electrode line (whose reference numeral is omitted) which is connected to a negative electrode of the DC power supply B, and is one example of the "switching device" according to the present invention. A collector terminal of the switching element Q1 is connected to the positive electrode line, and an emitter terminal of the switching element Q2 is connected to the negative electrode line. The diodes D1 and D2 are rectifying elements that allow only current flowing from the emitter side to the collector side, in the respective switching elements.

In the embodiment, the switching element includes the switching element Q1 on a higher potential side than the connection point at which the end of the reactor L1 is connected and the switching element Q2 on a lower potential side, and constitutes a two-arm boost converter. Such a configuration of the switching elements, however, is one example, and the boost converter may be a one-arm boost converter provided only with the switching element Q2 in FIG. 1.

The switching elements Q1 and Q2 and each of switching elements (Q3 to Q8) of the inverter 300 described later are configured, for example, as an insulated gate bipolar transistor (IGBT), a power metal oxide semiconductor (MOS) transistor, or the like.

The capacitor C is a condenser connected between the positive electrode line and the negative electrode line. Interterminal voltage of the capacitor C, i.e. a potential difference VH between the positive electrode line and the negative electrode line, is output voltage of the boost converter 200. Hereinafter, the output voltage VH of the capacitor C will be expressed as "output voltage VH" as occasion demands.

The inverter 300 is a power converter provided with a U-phase arm (whose reference numeral is omitted) including a p-side switching element Q3 and an n-side switching element Q4, a V-phase arm (whose reference numeral is omitted) including a p-side switching element Q5 and an n-side switching element Q6, and a W-phase arm (whose reference numeral is omitted) including a p-side switching element Q7 and an n-side switching element Q8. The respective arms of the inverter 300 are connected in parallel between the positive electrode line and the negative electrode line.

Incidentally, rectifying diodes D3 to D8 which are configured to make current flow from the emitter side to the collector side are respectively connected to the switching elements Q3 to Q8, respectively, as with the switching elements Q1 and Q2. Moreover, midpoints between the p-side switching elements and the n-side switching elements of the respective phase arms of the inverter 300 are respectively connected to phase coils of the motor generator MG.

The motor generator MG is a three-phase alternating current (AC) motor generator in which a permanent magnet is embedded in a rotor. The motor generator MG is mechanically coupled with not-illustrated drive wheels of a vehicle, and is configured to generate torque for driving the vehicle. The motor generator MG can also perform power regeneration (power generation) by using a motion energy of the vehicle mainly during braking the vehicle. If this vehicle is a hybrid vehicle which is provided with an engine as a power source in addition to the motor generator MG, the motor generator MG may be mechanically coupled with the engine, and may be configured to perform the power regeneration by using the power of the engine and assist the power of the engine. The vehicle according to the embodiment may be this type of hybrid vehicle, or may be an electric vehicle provided only with the motor generator MG as the power source.

In the motor drive system 10, a not-illustrated sensor group is attached so as to detect the voltage VB of the DC power supply B, a battery current IB flowing through the reactor L1 of the boost converter 200 (one example of the "current flowing through the DC power supply or the boost converter" according to the present invention), the output voltage VH, a v-phase current Iv and a w-phase current Iw of the inverter 300, a motor rotational phase θ, which is a rotation angle of the rotor of the motor generator MG, and the like. Each of sensors that constitute the sensor group is electrically connected to the control apparatus 100, and detected values are referred to by the control apparatus 100, as occasion demands.

In the motor drive system 10, the boost converter 200 and the inverter 300 are electrically connected to the control apparatus 100, and their drive states are controlled by the control apparatus 100.

Figure 2:
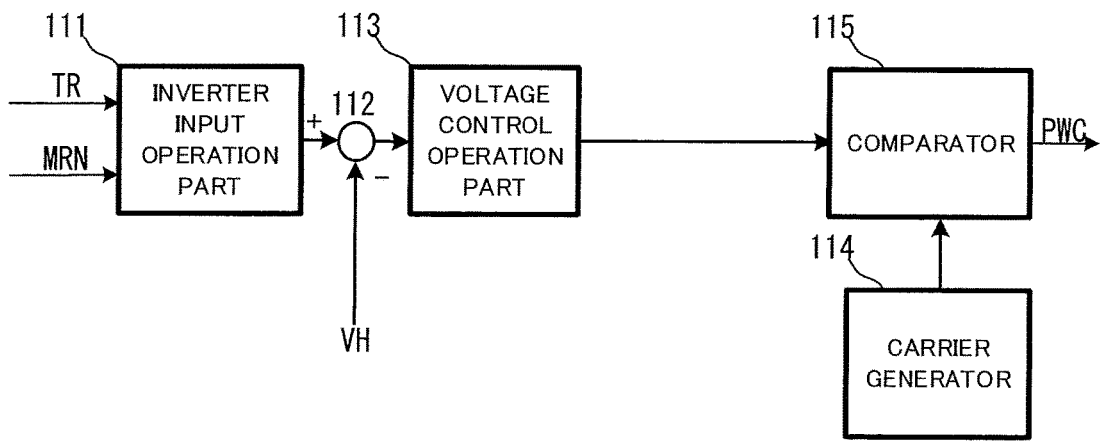
FIG. 2 is a block diagram illustrating a boost control unit in a control apparatus of the motor drive system in FIG. 1.

Next, with reference to FIG. 2, a configuration of the boost control unit 110 for controlling the boost converter 200 in the control apparatus 100 will be explained. FIG. 2 is a block diagram illustrating the boost control unit 110. In FIG. 2, the same parts as those in FIG. 1 will carry the same reference numerals, and the explanation thereof will be omitted as occasion demands.

In FIG. 2, the boost converter control unit 110 is provided with an inverter input operation part 111, an adder-subtractor 112, a voltage control operation part 113, a carrier generator 114, and a comparator 115. Incidentally, the boost converter control unit 110 is configured to execute boost control, an intermittent control process and a target value setting process described later, in accordance with a control program stored in the ROM in advance.

The boost control is control by which voltage between the positive electrode line and the negative electrode line, i.e. the output voltage VH, is boosted to be greater than or equal to the power supply voltage VB of the DC power supply B on the basis of a converter control signal PWC. In the boost control, when the output voltage VH is less than a target value VHtg (also referred to as a VH command value), on-duty of the switching element Q2 is set to be relatively large, which makes it possible to increase current flowing through the positive electrode line from the DC power supply B side to the inverter 300 side and to increase the output voltage VH. On the other hand, when the output voltage VH is greater than the target value VHtg, on-duty of the switching element Q1 is set to be relatively large, which makes it possible to increase current flowing through the positive electrode line from the inverter 300 side to the DC power supply B side and to reduce the output voltage VH.

The inverter input operation part 111 is a circuit configured to set the target value VHtg (i.e. one example of the "target value" according to the present invention) of the output voltage VH of the boost converter 200. The target value VHtg is determined to minimize a system loss Lsys, which is a loss of an entire power system including the boost converter 200, the inverter 300, and the motor generator MG.

The adder-subtractor 112 subtracts a detected value of the output voltage VH from the target value VHtg and outputs a subtraction result to the voltage control operation part 113. When receiving from the adder-subtractor 112 the subtraction result obtained by subtracting the detected value of the output voltage VH from the target value VHtg, the voltage control operation part 113 calculates a controlled variable for matching the output voltage VH with the target value VHtg. At this time, for example, known PI control calculation including a proportional term (P term) and an integral term (I term) or the like is used. The voltage control operation part 113 outputs the calculated controlled variable to the comparator 115 as a voltage command value.

The carrier generator 114 generates a carrier signal, which is a triangular wave, and transmits it to the comparator 115. The comparator 115 compares the voltage command value supplied from the voltage control operation part 113 with the carrier signal, and generates the aforementioned converter control signal PWC whose logical state varies depending on a magnitude relation of their voltage values. The generated converter control signal PWC is outputted to the switching elements Q1 and Q2 of the boost converter 200. The boost control unit 110 is configured as described above.

Figure 3:
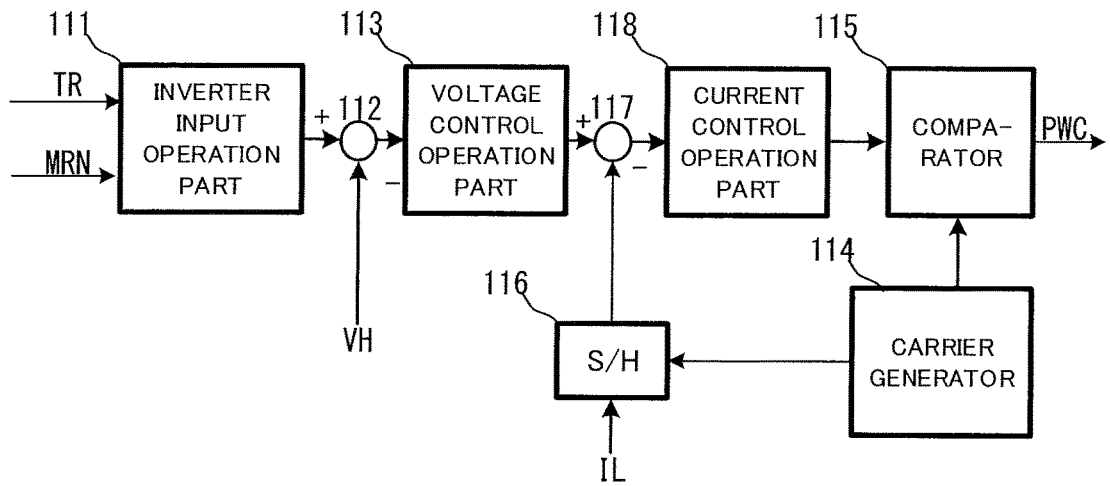
FIG. 3 is a block diagram illustrating another boost control unit in the control apparatus of the motor drive system in FIG. 1.

The configuration exemplified in FIG. 2 is a circuit configuration that realizes voltage control; however, a control method of the boost converter 200 is not limited to such voltage control. Now, with reference to FIG. 3, a configuration of a boost control unit 110' of the control apparatus 100 will be explained. FIG. 3 is a block diagram illustrating the boost control unit 110'. In FIG. 3, the same parts as those in FIG. 2 will carry the same reference numerals, and the explanation thereof will be omitted as occasion demands.

In FIG. 3, the boost control unit 110' is provided with an adder-subtractor 117 and a current control operation part 118, between the voltage control operation part 113 and the comparator 115.

The carrier generator 114 transmits the carrier signal to a sample hold (S/H) circuit 116, in addition to the comparator 115. The S/H circuit 116 samples the batter current IB in each timing of peaks and bottoms of the carrier signal received from the carrier generator 114.

Here, in the boost control unit 110', the voltage control operation part 113 generates a current command value IR for matching the output voltage VH with the target value VHtg. The adder-subtractor 117 subtracts a detected value of the battery current IB sampled and held by the S/H circuit 116, from the electric current command value IR. A subtraction result is transmitted to the current control operation part 118.

The current control operation part 118 calculates a controlled variable for matching the battery current IB with the current command value IR. At this time, for example, known PI control calculation including a proportional term (P term) and an integral term (I term) or the like is used. The current control operation part 118 outputs the calculated controlled variable to the comparator 115 as a duty command value d.

The comparator 115 compares a magnitude relation between the duty command value d and the carrier signal, and generates the converter control signal PWC and supplies it to each of switching elements. In other words, the boost control unit 110' has a circuit configuration that realizes current control. Even such a configuration allows the boost converter 200 to be preferably controlled.

Figure 4:
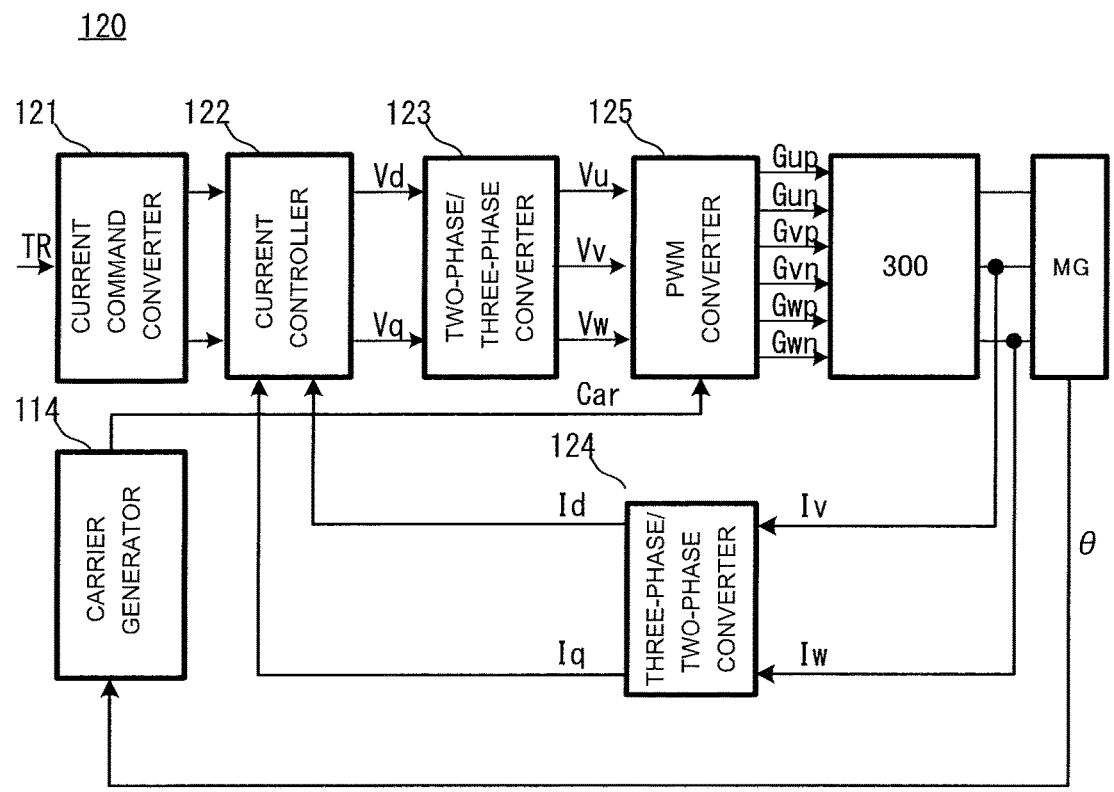
FIG. 4 is a block diagram illustrating an inverter control unit in the control apparatus of the motor drive system in FIG. 1.

Next, with reference to FIG. 4, a configuration of the inverter control unit 120 will be explained. FIG. 4 is a block diagram illustrating the inverter control unit 120. In FIG. 4, the same parts as those in each of the figures described above will carry the same reference numerals, and the explanation thereof will be omitted as occasion demands.

In FIG. 4, the inverter control unit 120 is provided with a current command converter 121, a current controller 122, a two-phase/three-phase converter 123, a three-phase/two-phase converter 124, a carrier generator 114 (shared with the boost control unit 110), and a PWM converter 125.

The current command converter 121 generates two-phase current command values (Idtg, Iqtg) on the basis of a torque command value TR of the motor generator MG.

On the other hand, from the inverter 300, the v-phase current Iv and the w-phase current Iw are supplied to the three-phase/two-phase converter 124 as feedback information. The three-phase/two-phase converter 124 converts three-phase current values which are the v-phase current Iv and the w-phase current Iw to two-phase current values, which include a d-axis current Id and a q-axis current Iq. The converted two-phase current values are transmitted to the current controller 122.

The current controller 122 generates two-phase voltage command values, which include a d-axis voltage Vd and a q-axis voltage Vq, on the basis of a difference between the two-phase current command values generated on the current command converter 121 and the two-phase current values Id and Iq received from the three-phase/two-phase converter 124. The generated two-phase voltage command values Vd and Vq are transmitted to the two-phase/three-phase converter 123.

The two-phase/three-phase converter 123 converts the two-phase voltage command values Vd and Vq to three-phase voltage command values Vu, Vv and Vw. The converted three-phase voltage command values Vu, Vv and Vw are transmitted to the PWM converter 125.

Here, the PWM converter 125 is configured to receive a carrier Car having a predetermined carrier frequency fcar from the carrier generator 114. The PWM converter 125 compares a magnitude relation between the carrier Car and the converted three-phase voltage command values Vu, Vv and Vw. Moreover, the PWM converter 125 generates u-phase switching signals Gup and Gun, v-phase switching signals Gyp and Gvn, and w-phase switching signals Gwp and Gwn, whose logical states vary depending on a comparison result, and supplies them to the inverter 300.

More specifically, of the switching signals corresponding to each phase, the signal with an identifier of "p" means a drive signal for driving the p-side switching element (Q3, Q5 or Q7) of the switching elements for each phase, and the signal with an identifier of "n" means a drive signal for driving the n-side switching element (Q4, Q6 or Q8) of the switching elements for each phase.

Here, in particular, when the carrier Car and the voltage command value for each phase are compared, when the voltage command value for each phase that is less than the carrier Car matches the carrier Car, the switching signal for turning on the p-side switching element is generated. Moreover, when the voltage command value for each phase that is greater than the carrier Car matches the carrier Car, the switching signal for turning on the n-side switching element is generated. In other words, the switching signals are signals which includes both of on and off, and either one of the p-side and n-side switching elements for each phase is always in the on state and the other is in the off state.

When the inverter 300 is changed to or maintained in a drive state of each of the switching elements which are defined by the switching signals for each phase, the motor generator MG is driven in accordance with a circuit state corresponding to the changed or maintained drive state. Such a control aspect of the inverter 300 is one aspect of so-called PWM control.

In general, in many cases, the motor generator MG for driving the vehicle also uses known overmodulation control and rectangular wave control, in addition to the aforementioned PWM control. Even in the motor drive system 10 according to the embodiment, the control aspect of the inverter 300 may be changed, as occasion demands, according to a traveling condition of the vehicle.

<Operation of Embodiment>

Next, as the operation of the embodiment, the intermittent control process and the target value setting process which are executed by the boost control unit 110 will be explained.

<Outline of Intermittent Control Process>

The boost converter 200 boosts the power supply voltage VB by the aforementioned boost control when the power supply voltage VB of the DC power supply B is needed to be boosted. In the boost control, the output voltage VH of the boost converter 200 is maintained at the target value VHtg in a stationary state. For example, the target value VHtg can have a value of approximately 650 V.

In contrast, switching states of the switching elements Q1 and Q2 of the boost converter 200 are constantly changed during a boosting operation accompanied by the boost control. The boost converter 200 always generates a boost loss Lcv in the boost control, because the change of the switching states results in a voltage variation referred to as switching ripple. The boost loss Lcv is a factor for increasing the system loss Lsys, which is the loss of the entire power system including the boost converter 200, the inverter 300, and the motor generator MG. The intermittent control process is control for reducing the system loss Lsys, and is a process for intermittently performing the aforementioned boost control (i.e. performing intermittent boosting).

<Details of Intermittent Control Process>

Figure 5:
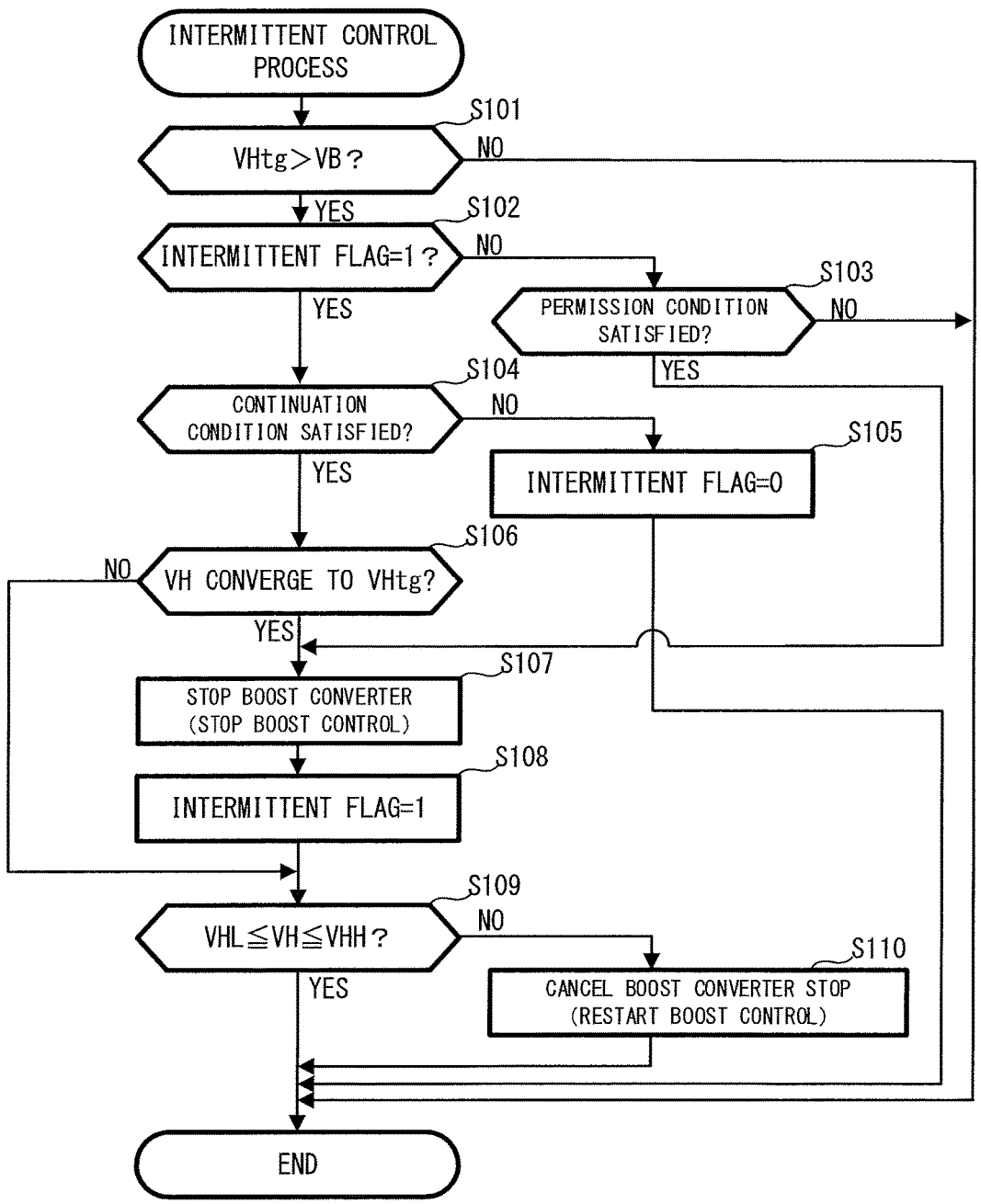
FIG. 5 is a flowchart illustrating an intermittent control process in the control apparatus of the motor drive system in FIG. 1.

Now, with reference to FIG. 5, the details of the intermittent control process will be explained. FIG. 5 is a flowchart illustrating the intermittent control process. The intermittent control process is assumed to be control that is repeatedly performed with a predetermined period.

In FIG. 5, it is determined whether or not the target value VHtg, which is set by the target value setting process described later, is greater than the power supply voltage VB, i.e. whether or not the boost control is required (step S101). When the target value VHtg is less than or equal to the power supply voltage VB (the step S101: NO), the intermittent control process is ended. As described above, the intermittent control process is the control that is repeated with the predetermined period, and is restarted from the process step S101 after a lapse of proper time after the end.

When the target value VHtg is greater than the power supply voltage VB (the step S101: YES), i.e. when the boost control is required, it is determined whether or not an intermittent flag is set to "1" (step S102). The intermittent flag is a flag which indicates an execution history of the intermittent boosting. When there is the execution history, the intermittent flag is maintained at "1" until the execution history is cleared. An initial value of the intermittent flag is "0". Therefore, when the intermittent control process is firstly executed, the step S102 branches to a "NO" side.

When the intermittent flag is "0" (the step S102: NO), it is determined whether or not a permission condition is satisfied (step S103). When the permission condition is not satisfied (the step S103: NO), the intermittent control process is ended.

The permission condition according to the embodiment is a condition in which the start of the intermittent boosting is permitted, and includes each of the following conditions (1) to (3):

(1) the output voltage VH is stable;

(2) an absolute value of the battery current IB is within a predetermined value; and (3) a rate of change of an output of the motor generator MG or the DC power supply B is within a predetermined value.

In the permission condition (1), "the output voltage VH is stable" includes two meanings. One is that the target value VHtg is unchangeable for a certain period or more, and the other is that the output voltage VH converges to the target value VHtg. In the step S103, various actual determination processes can be used. For example, in the latter meaning, a determination condition may be a condition that a deviation between the target value VHtg and the output voltage VH is less than or equal to a reference value, a condition that a state in which the deviation between the target value VHtg and the output voltage VH is less than or equal to the reference value continues for a predetermined time or more, a condition that degree of a variation of the output voltage VH over a certain period is less than or equal to a predetermined value, or the like.

The permission condition (2) is prepared on the basis of a possibility that the boost loss Lcv increases when an absolute value of the battery current IB is large. An influence of the battery current IB on the boost loss Lcv will be explained in detail in a third embodiment.

In the permission condition (3), the rate of change of the output does not mean an absolute value of the output but means a temporal change rate of the output. As an example of a case where the rate of change of the output of the motor generator MG or the DC current supply B is a large, if there is a frequent accelerator on/off in the vehicle, if there are rapid acceleration and rapid deceleration, or if the vehicle slips or excessively grips, then, the battery current IB and the output of the motor generator MG can transiently pass through a zero point. However, if the stop of the boost control is permitted under such transient circumstances, there is a possibility that the operation of the boost converter 200 cannot follow a rapid change of those drive conditions. To address such a problem, the intermittent boosting is prohibited under this type of transient circumstances, and the performance of the motor drive system 10 is ensured. Instead of the rate of the change of the output exemplified here, a rate of the change of an accelerator opening degree Ta, which is a manipulated amount of an accelerator pedal, and number of motor revolutions may be also used.

If the permission condition is satisfied (the step S103: YES), the boost control unit 110 stops the boost converter 200 (step S107). In other words, the intermittent boosting is started. To "stop the boost converter 200" means to stop the boosting operation of the boost converter 200, i.e. to shut down the boost converter 200 and stop the boost control itself. If the boost converter 200 is stopped, the boost control unit 110 sets the intermittent flag to "1" (step S108). In other words, the execution history of the intermittent boosting is stored.

When the intermittent flag is set to "1", it is determined whether or not the output voltage VH is maintained in a range which is greater than or equal to a lower limit value VHL and is less than or equal to an upper limit value VHH (step S109). The range between the lower limit value VHL and the upper limit value VHH is a voltage variation allowable range as one example of the "range" according to the present invention.

The voltage variation allowable range according to the embodiment is set according to the target value VHtg. Specifically, by using an offset value OFS, the upper limit value VHH is set to "VHtg+OFS", and the lower limit value VHL is set to "VHtg−OFS". For example, the offset value OFS may be a value of about 50 V. Such an aspect of setting the voltage variation allowable range is one example. For example, the upper limit value VHH and the lower limit value VHL may be set by multiplying the target value VHtg by a predetermined coefficient. In this case, a correction coefficient for defining the upper limit value VHH is greater than 1, and a correction coefficient for defining the lower limit value VHL is less than 1.

When the output voltage VH is maintained in the voltage variation allowable range (the step S109: YES), the intermittent control process is ended. When it is determined that the output voltage VH reaches a boundary value of the voltage variation allowable range (the step S109: NO), the stop of the boost converter 200 is canceled (step S110). In other words, the boost control based on the target value VHtg is restarted. If the boost control is restarted, the intermittent control process is ended.

On the other hand, since the intermittent flag is set to "1" in the step S108, the process branches to a "YES" side in the next step S102 (the step S102: YES) and a step S104 is executed. In the step S104, it is determined whether or not a continuation condition is satisfied. The continuation condition is a condition in which the continuation of the intermittent boosting is permitted, and is a condition that is set not to cause any trouble in the drive of the motor generator MG, which is a loading apparatus, when the intermittent boosting is continued. The continuation condition in the embodiment is defined from the above permission conditions (2) and (3). This is, however, one example, and instead of or in addition to those conditions, the following conditions may be also used: for example, a condition that a rate of the change of the battery current IB is within a predetermined value, a condition that a change amount of the rate of the change of the output of the motor generator MG or the DC power supply B is within a predetermined value, a condition that a change amount of a reference target value VHtgb described later is within a predetermined value, and the like. When the continuation condition is not satisfied (the step S104: NO), the intermittent flag is reset to "0" (step S105), and the intermittent control process is ended. In other words, a normal boost control (or constant boosting) is started.

On the other hand, when the continuation condition is satisfied (the step S104: YES), i.e. qualitatively, when the drive conditions of the DC power supply B and the motor generator MG do not significantly change in comparison with those during the previous stop of the boost control, it is determined whether or not the output voltage VH converges to the target value VHtg (step S106). Here, until the cancellation of the stop according to the step S110 is executed, the output voltage VH deviates from the target VHtg according to the drive condition of the motor generator MG, which is a loading apparatus. Therefore, the step S106 branches to a "NO" side, and as long as the continuation condition is satisfied, the stop of the boost control is continued until the output voltage VH reaches the upper limit value VHH or the lower limit value VHL of the voltage variation allowable range.

Moreover, when the cancellation of the stop according to the step S110 is executed, the output voltage VH starts to converge from the output voltage VH at that time point toward the target value VHtg when the previous boost control is executed, by the restarted boost control. Therefore, the output voltage VH reaches the target value VHtg after a lapse of proper time, and the step S106 branches to a "YES" side. When the output voltage VH converges to the target value VHtg after the restart of the boost control as described above (the step S106: YES), the boost converter 200 is stopped again (step S107). In the step S106, instead of determining whether or not the output voltage VH converges to the target value VHtg, it may be determined whether or not the output voltage VH reaches the target value VHtg.

As described above, according to the intermittent control process, the output voltage VH of the boost converter 200 varies between the target value VHtg and the upper limit value VHH or the lower limit value VHL of the voltage variation allowable range. When the output voltage VH varies between the target value VHtg and the upper limit value VHH, the motor generator MG is substantially in the regenerative state, and when the output voltage VH varies between the target value VHtg and the lower limit value VHL, the motor generator MG is substantially in the power-running state.

<Effect of Intermittent Control Process>

Figure 6:
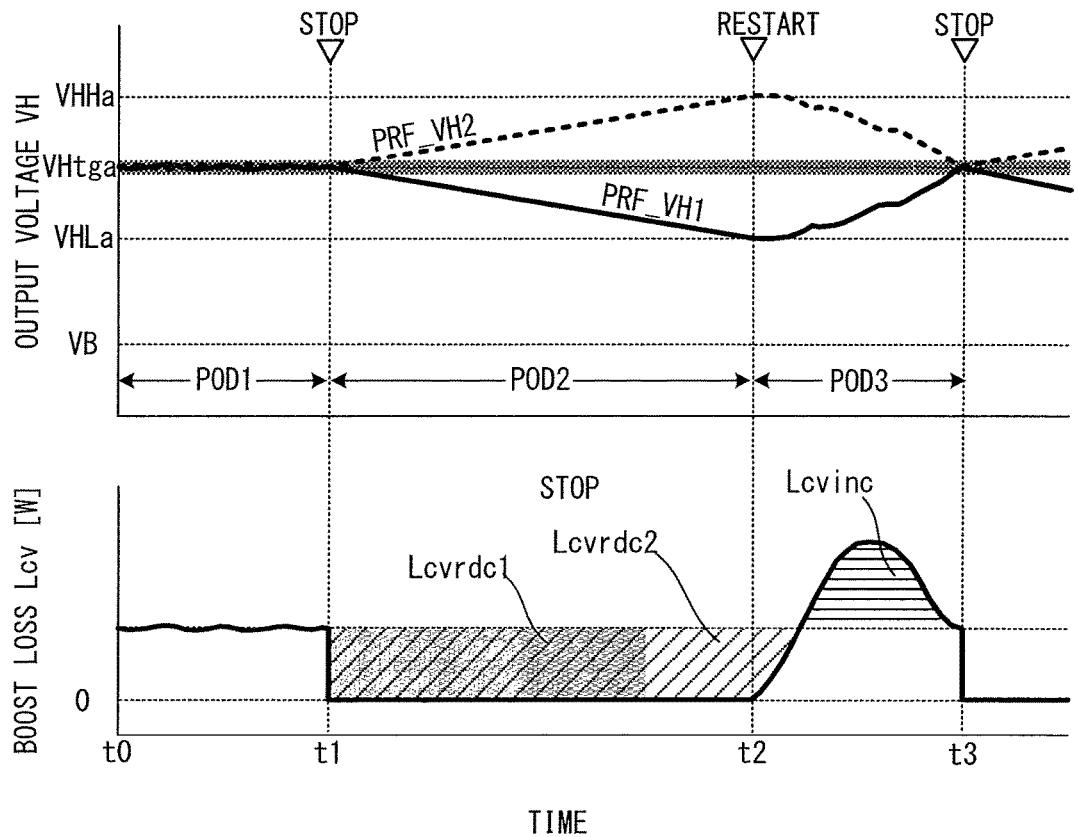
FIG. 6 is a timing chart illustrating one temporal transition of output voltage VH and a boost loss Lcv of a boost converter during the execution of the intermittent control process in FIG. 5.

Next, with reference to FIG. 6, an effect of the intermittent control process will be explained. FIG. 6 is a timing chart illustrating one temporal transition of the output voltage VH and the boost loss Lcv during the implementation of the intermittent control process.

In FIG. 6, an upper part indicates the temporal transition of the output voltage VH, and a lower part indicates the temporal transition of the boost loss Lcv. In FIG. 6, it is assumed that the target value VHtg is VHtga (VHtga>VB).

In the temporal transition of the output voltage VH, the output voltage VH at a time point t0 is substantially stable at a target value VHtga. In other words, the output voltage VH converges in a stop allowable range which is hatched in the drawing. Now, it is assumed that the stable state continues until a time point t1 and thus the above described permission condition is satisfied and the boost converter 200 is stopped. Here, in order to simplify an explanation, the permission condition is assumed to be only that the output voltage VH is stable (the permission condition (1)).

When the boost converter 200 is stopped, the output voltage VH increases or decreases according to the drive state of the motor generator MG, which is a loading apparatus. FIG. 6 illustrates, as an illustrated PRF_VH1 (or a solid line), the temporal transition in which the motor generator MG is in the power-running state and in which the output voltage VH decreases after the time point t1. Moreover, FIG. 6 illustrates, as an illustrated PRF_VH2 (or a dashed line), the temporal transition in which the motor generator MG is in the regenerative state and in which the output voltage VH increases after the time point t1. Hereinafter, PRF_VH1 will be exemplified for explanation.

When the output voltage VH that keeps decreasing after the time point t1 reaches a lower limit value VHLa, which is set on the basis of the target value VHtga, at a time point t2, the step S109 in the above described intermittent control process branches to the "NO" side, and the boost control is restarted. As a result, the output voltage VH returns to the target value VHtga at a time point t3. When the output voltage VH reaches the target value VHtga at the time point t3, the boost converter 200 is stopped again.

On the other hand, the temporal transition of the boost loss Lcv illustrates that the boost loss Lcv, which is substantially constant in a first period POD1 from the time point t0 to the time point t1, becomes zero when the boost control is stopped at the time point t1. The boost loss Lcv is maintained at zero in a second period POD2 from the time point t1 to the time point t2 at which the boost control is restarted. When the boost control is restarted at the time point t2, the boost loss Lcv increases and becomes a value that is greater than zero in a third period POD3 from the time point t2 to a time point t3 at which the boost control is stopped again.

Here, a period which is obtained by combining the second period POD2 and the third period POD3 in FIG. 6 is a period that is from the stop of the boost control to the re-stop of the boost control through the cancellation of the stop, and corresponds to one example of the "period including the execution period and the stop period of the boost control, which are continuous to each other, in the intermittent process of the boost control" according to the present invention. In other words, the process in the period which is obtained by combining the second period POD2 and the third period POD3 is one example of the "unit intermittent process" according to the present invention. Hereinafter, the process in the period which is obtained by combining the second period POD2 and the third period POD3 is expressed as the "unit intermittent process" as occasion demands.

Here, period which is obtained by combining the second period POD2 and the third period POD3 is regarded as a period which defines the unit intermittent process according to the present invention, but this is merely one example. In other words, the "period including the execution period and the stop period of the boost control, which are continuous to each other" may be, for example, a period which is obtained by combining the third period POD3 and a subsequent stop period of the boost control partially not illustrated (a period from the time point t3 to a restart time point of the boost control), with reference to FIG. 6. Therefore, for example, a process in the period which is obtained by combining the third period POD3 and the subsequent stop period of the boost control is also one preferable example of the "unit intermittent process" according to the present invention.

The total of the boost loss Lcv in the unit intermittent process is a difference between a loss decrease amount and a loss increase amount, when a loss in the case where the output voltage VH is maintained at the target value VHtg is a reference (i.e. zero).

The loss decrease amount is the sum of an illustrated loss decrease amount Ldvrdc1 (dark oblique hatching) and an illustrated loss decrease mount Lcvrdc2 (light oblique-line hatching), and the loss increase amount is an illustrated loss increase amount Lcvinc (horizontal hatching). In FIG. 6, an absolute value of the loss decrease amount Lcvrdc2 is equal to an absolute value of the loss increase amount Lcvinc, and the total of the boost loss Lcv realized by the intermittent control prcess is equal to the loss decrease amount Lcvrdc1. It is clear that the boost loss Lcv is significantly reduced by the intermittent control process, because the loss decrease amount Lcvrdc1 is a negative value. The total further increases to the negative side as the output voltage VH varies more slowly after the stop of the boost control.

Figure 7:
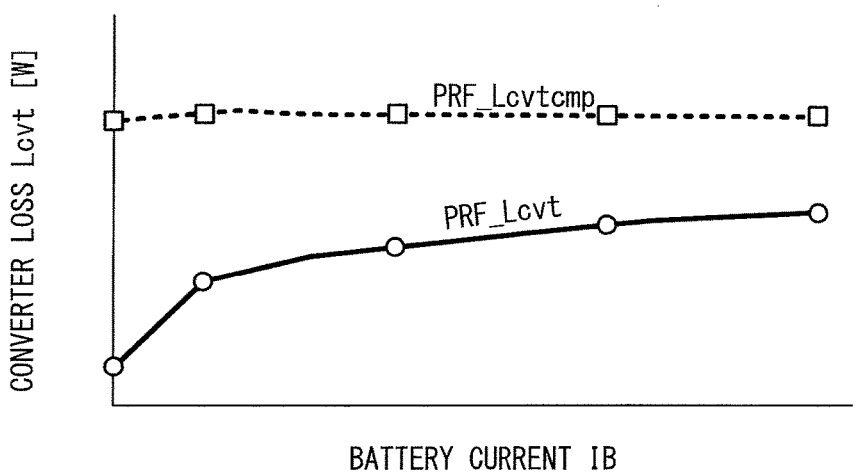
FIG. 7 is a diagram illustrating a relation between a converter loss Lcvt and a battery current IB when the intermittent control process in FIG. 5 is executed.

Next, with reference to FIG. 7, the boost los Lcv generated in the boost converter 200 per unit time in the intermittent control will be explained. FIG. 7 is a diagram illustrating a relation between a converter loss Lcvt and the battery current IB when the intermittent control is executed. The converter loss Lcvt is a value obtained by dividing the sum of the boost loss Lcv in the unit intermittent process by a length of the period of the unit intermittent process, and means the boost loss Lcv generated in the boost converter 200 per unit time.

FIG. 7 illustrates the converter loss Lcvt on a vertical axis and the battery current IB on a horizontal axis.

An illustrated PRF_Lcvtcmp (refer to a dashed line) is a comparative example, and represents the converter loss in the case where the output voltage VH is maintained at the target value VHtg in the period without the intermittent control process according to the embodiment executed.

On the other hand, an illustrated PRF_Lcvt (refer to a solid line) indicates the converter loss Lcvt in the case where the intermittent control process according to the embodiment is executed. As described above, when the intermittent control process according to the embodiment is executed, the boost loss Lcv becomes zero in the second period PGD2 as illustrated in FIG. 6, and thus, the converter loss Lcvt, which is a value per unit time, is reduced more significantly than that in the comparative example even if the boost loss Lcv increases to some degree in the third period POD3. In particular, when the battery current IB is sufficiently small, the converter loss Lcvt is significantly reduced because the second period PGD2 is relatively long. In other words, according to the intermittent control process, the system loss Lsys can be reduced by reducing the converter loss Lcvt.

<Problem of Intermittent Boosting>

Figure 8:
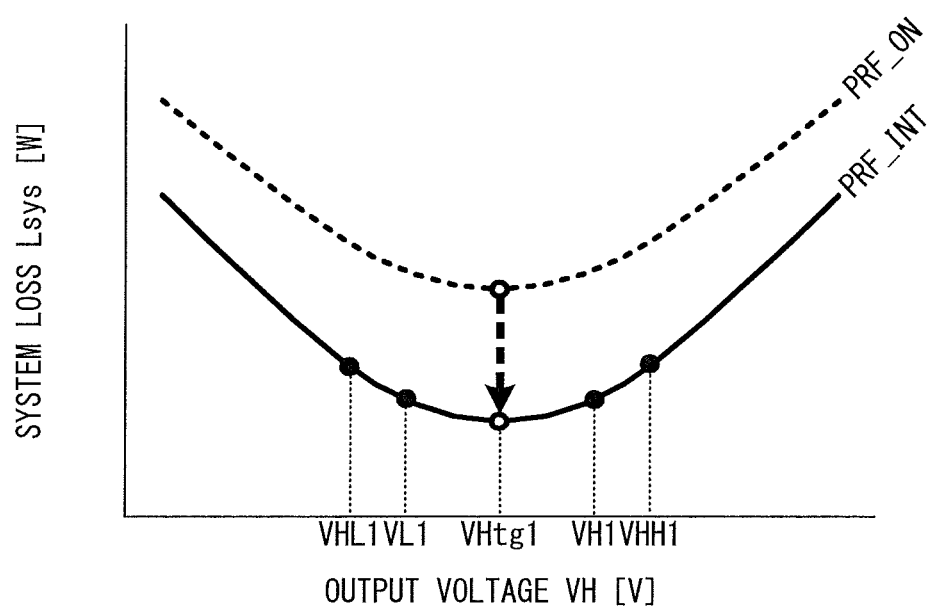
FIG. 8 is a diagram explaining the output voltage VH during the execution of intermittent boosting.

Now, a problem of the intermittent boosting will be explained with reference to FIG. 8. FIG. 8 is a diagram explaining the output voltage VH during the execution of the intermittent boosting. In FIG. 8, the same parts as those in each of the figures described above will carry the same reference numerals, and the explanation thereof will be omitted as occasion demands.

FIG. 8 respectively illustrates the system loss Lsys and the output voltage VH on a vertical axis and a horizontal axis. Moreover, a characteristic of the system loss Lsys in a case where the intermittent boosting is not executed (i.e. in a case where the constant boosting is executed), is illustrated as an illustrated PRF_ON (or a dashed line), and a characteristic of the system loss Lsys in a case where the intermittent boosting is executed is illustrated as an illustrated PRF_INT (or a solid line).

The target value VHtg of the output voltage VH of the boost converter 200 in the boost control is determined to minimize the system loss Lsys with respect to the drive condition of the motor generator MG as a loading apparatus (refer to white circles illustrated), and even if the output voltage VH increases or decreases with respect to the target value VHtg (or VHtg1 in FIG. 8), the system loss Lsys increases. Such a quadratic relation does not change even during the execution of the intermittent boosting, and the characteristic PRF_INT substantially has a form which is obtained by shifting the characteristic PRF_ON downward by an amount of the boost loss Lcv of the boost converter 200.

Here when the intermittent boosting is stared, the output voltage VH varies between the target value VHtg1 and the boundary value of the voltage variation allowable range. For example, when the upper limit value VHH of the voltage variation allowable range is set to VHH1 and the lower limit value is set to VHL1, the output voltage VH respectively varies between VHtg1 and VHH1 during the regeneration and between VHtg1 and VHL1 during the power running.

Thus, the effective output voltage VH in the execution period of the intermittent boosting is VH1, which is higher than the target value VHtg1, during the regeneration, and is VL1, which is lower than the target value VHtg1, during the power running. As is clear from the illustrated $PRF_{13}$ INT, the system loss Lsys in the effective output voltage VH is higher than the system loss Lsys when the target value is the target value VHtg1. Namely, the system loss Lsys is not minimized during the execution of the intermittent boosting.

Figure 9:
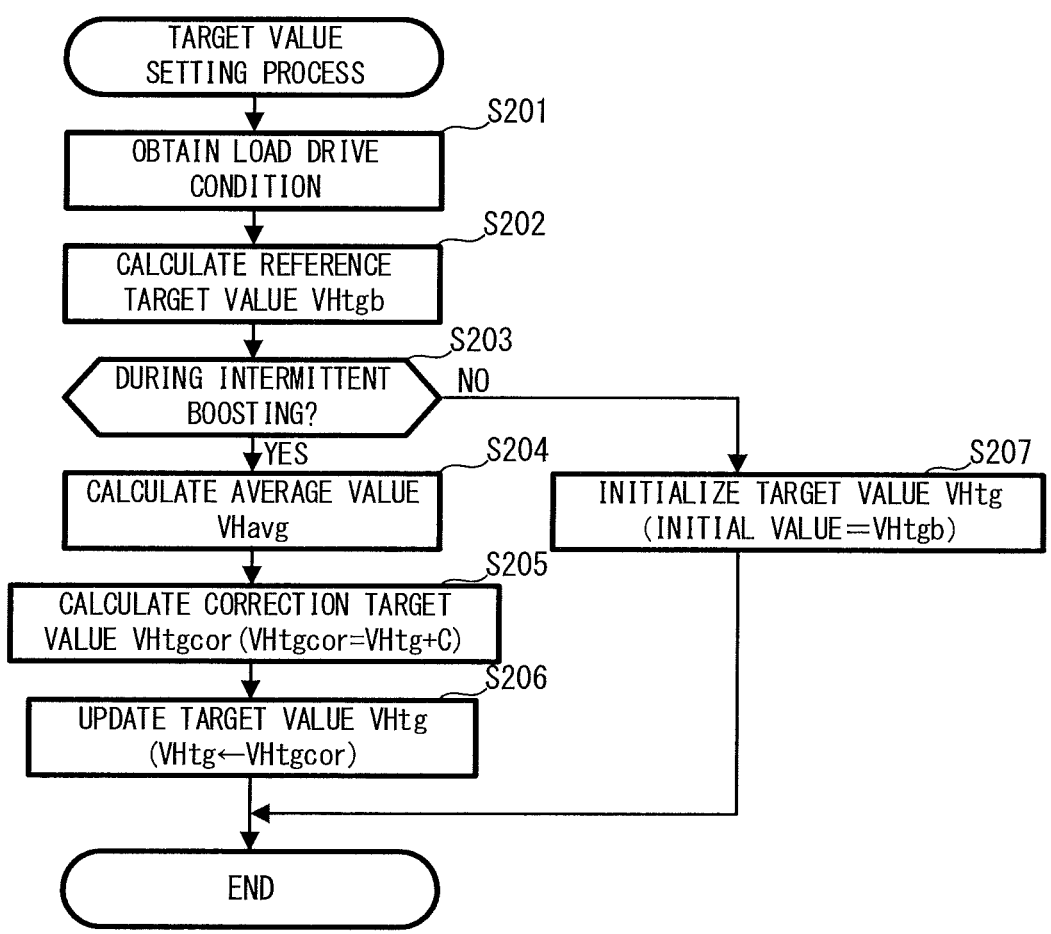
FIG. 9 is a flowchart illustrating a target value setting process in the motor drive system in FIG. 1.

The above described problem which is uniquely occurs when the intermittent boosting is executed is solved by the target value setting process which is executed by the boost control unit 110 in the embodiment. Now, with reference to FIG. 9, the details of the target value setting process will be explained. FIG. 9 is a flowchart illustrating the target value setting process.

In FIG. 9, when the target value setting process is started, the drive condition of the loading apparatus (here, the motor generator MG) is firstly obtained (step S201). Specifically, for example, an output value of the motor generator MG is calculated as the drive condition, from the torque command value TR of the motor generator MG and a motor rotational speed MRN.

Then, the reference target value VHtgb, which is a reference value of the target value VHtg, is calculated on the basis of the drive condition (step S202). The reference target value VHtgb is determined to minimize the system loss Lsys in a voltage range that is greater than or equal to a required voltage value which is required for driving the loading apparatus (here, the motor generator MG). Namely, the value which is expressed as the target value VHtg in the aforementioned explanation is the reference target value VHtgb. With regard to the reference target value VHtgb, a voltage value at which the sum of the respective losses in the DC power supply B, the boost converter 200, the inverter 300, and the motor generator MG is minimized in the voltage range that is greater than or equal to the required voltage value, is determined as the reference target value VHtgb. Such a method of determining the reference target value VHtgb is one example, and various known methods can be applied thereto.

When the reference target value VHtgb is determined, it is determined whether or not the intermittent boosting is executed (step S203). If the intermittent boosting is not executed (the step S203: NO), the target value VHtg is initialized with the reference target value VHtgb as an initial value (step S207). After the target value VHtg is initialized, the target value setting process is ended.

When the intermittent boosting is executed (the step S203: YES), an average value VHavg of the output voltage VH is calculated (step S204). Here, in particular, the average value VHavg is obtained by adding and averaging a plurality of values of the output voltage VH detected in accordance with a predetermined sampling period in the aforementioned unit intermittent process. The calculation of the average value in the unit intermittent process allows accurate estimation of the effective output voltage VH in the intermittent boosting.

Here, although it is configured in such a manner that the average value of the output value VH in one unit intermittent process is obtained, it may be configured in such a manner that respective average values are obtained in a plurality of unit intermittent processes and the respective average values are further added and averaged. In this manner, the average value with a reduced error can be obtained. Moreover, here, the average value is assumed to be an addition average value; however, it is obvious that various known aspects can be used as an averaging process for obtaining the average value.

After the average value VHavg of the output voltage VH is calculated, the target value VHtg is corrected on the basis of the average value VHavg, and a correction target value VHtgcor is calculated (step S205). The correction target value VHtgcor is determined, for example, in the following procedure.

Firstly, a deviation ΔVHtg between the reference target value VHtgb and the average value VHavg (ΔVHtg=VHtgb−VHavg) is calculated. The deviation ΔVHtg is a positive value in the intermittent boosting during the power running and is a negative value in the intermittent boosting during the regeneration. Then, the deviation ΔVHtg is multiplied by a correction coefficient k (0<k≤1) to calculate a correction value C (C=k*ΔVHtg). Then, the latest target value VHtg at a current time point and the correction value C are added to calculate the correction target value VHtgcor (VHtgcor=VHtg+C).

After the correction target value VHtgcor is calculated in the step S205, the target value VHtg at the current time point is updated to the correction target value VHtgcor (step S206). After the target VHtg is updated, the target value setting process is ended. The target value setting process is repeatedly executed with a predetermined period, as in the aforementioned intermittent control process, and the process is repeated again from the step S201.

Here, when the motor generator MG is in the power-running state during the execution of the intermittent boosting, the correction target value VHtgcor is greater than the reference target value VHtgb because the correction value C is a positive value. As a result, with reference to FIG. 8, the target value (or the white circle) on PRF_INT is shifted to the right in FIG. 8, and the average value VHtgavg, which is the effective output voltage VH, approaches the reference target value VHtgb. Then, when the average value VHtgavg matches the reference target value VHtgb, the correction value C become zero because the deviation ΔVHtg becomes zero, and the correction target value VHtgcor matches the target value VHtg at the current time point. In other words, the target value VHtg converges.

Moreover, when the motor generator MG is in the regenerative state during the execution of the intermittent boosting, the correction target value VHtgcor is less than the reference target value VHtgb because the correction value C is a negative value. As a result, with reference to FIG. 8, the target value (or the white circle) on PRF_INT is shifted to the left in FIG. 8, and the average value VHtgavg, which is the effective output voltage VH, approaches the reference target value VHtgb. Then, when the average value VHtgavg matches the reference target value VHtgb, the correction value C become zero because the deviation ΔVHtg becomes zero, and the correction target value VHtgcor matches the target value VHtg at the current time point. In other words, the target value VHtg converges.

As explained above, according to the target value setting process, the output voltage VH varies in the execution period of the intermittent boosting, and thus, the average value of the output voltage VH that varies is treated as the effective output voltage VH. Then, the target value VHtg is fixed when the average value VHavg, which is the effective output voltage value, matches the reference target value VHtgb. Therefore, even in the execution period of the intermittent boosting, a state equivalent to that the output voltage VH is maintained at the reference target value VHtgb in the normal boost control is realized, and the system loss Lsys is minimized.

<Second Embodiment>

In the first embodiment, when the target value VHtg is determined, the voltage variation allowable range is also set by the aforementioned offset value OFS. In particular circumstances, however, it is necessary to pay attention to the setting of the voltage variation allowable range. A second embodiment of the present invention which considers such a situation will be explained.

Figure 10:
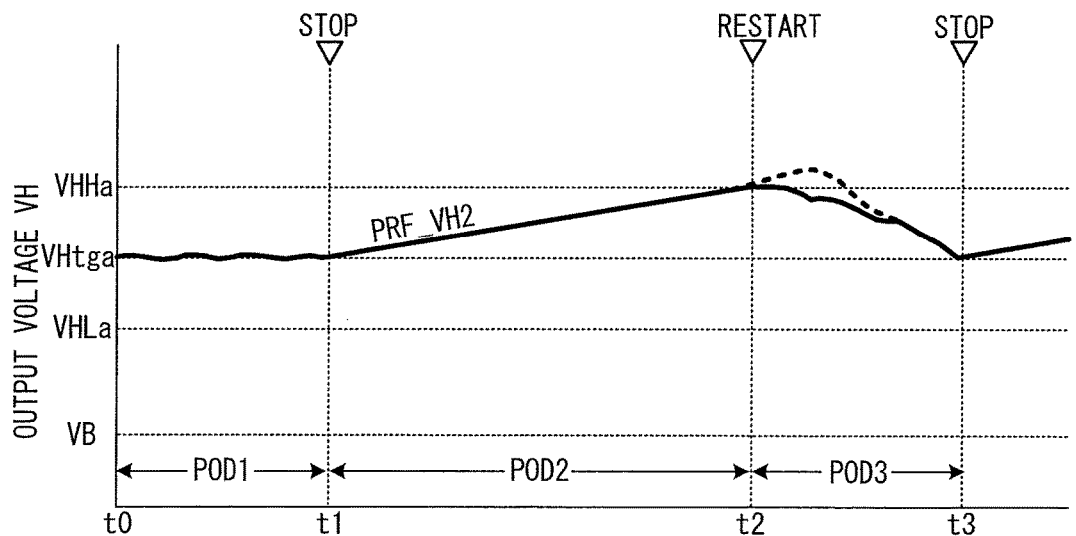
FIG. 10 is a diagram explaining overshoot of the output voltage VH during the execution of the intermittent boosting, according to a second embodiment of the present invention.

Now, with reference to FIG. 10, a problem in a case where the voltage variation allowable range is uniformly set according to the target value VHtg will be explained. FIG. 10 is a diagram explaining overshoot of the output voltage VH. In FIG. 10, the same parts as those in FIG. 6 will carry the same reference numerals, and the explanation thereof will be omitted as occasion demands.

FIG. 10 illustrates the change of the output voltage VH during the regeneration exemplified in FIG. 6. Here, the output voltage VH reaches an upper limit value VHHa at the time point t2 during continuation of the stop of the boost control, and the boost control is restarted. In this case, ideally, the output voltage VH does not exceed the upper limit value VHHa of the voltage variation allowable range, as illustrated in a solid line.

However, in a practical operation, even if a restart condition of the boost control (in this case, control for reducing the output voltage VH) is satisfied at the time point t2, the output voltage VH keeps increasing (refer to a dashed line) even for an extremely short time in which the boost converter 200 actually starts to operate. Thus, the output voltage VH transiently overshoots, and exceeds the upper limit value VHHa in some cases.

On the other hand, both a high voltage side and a low voltage side of the voltage variation allowable range are determined by the target value VHtg and the offset value OFS, and are basically symmetric to the target value VHtg. Here, when the target value VHtg is sufficiently large, the upper limit value VHH of the voltage variation allowable range approaches a withstand voltage value set for various parts that constitute the boost converter 200. Thus, in some cases, the output voltage VH possibly exceeds the withstand voltage value, even temporarily, due to the aforementioned overshoot.

Thus, in the embodiment, the boost control unit 110 corrects the upper limit value VHH of the voltage variation allowable range according to the target value VHtg. In other words, the boost control unit 110 is configured to function as one example of the "range setting device" according to the present invention.

Figure 11:
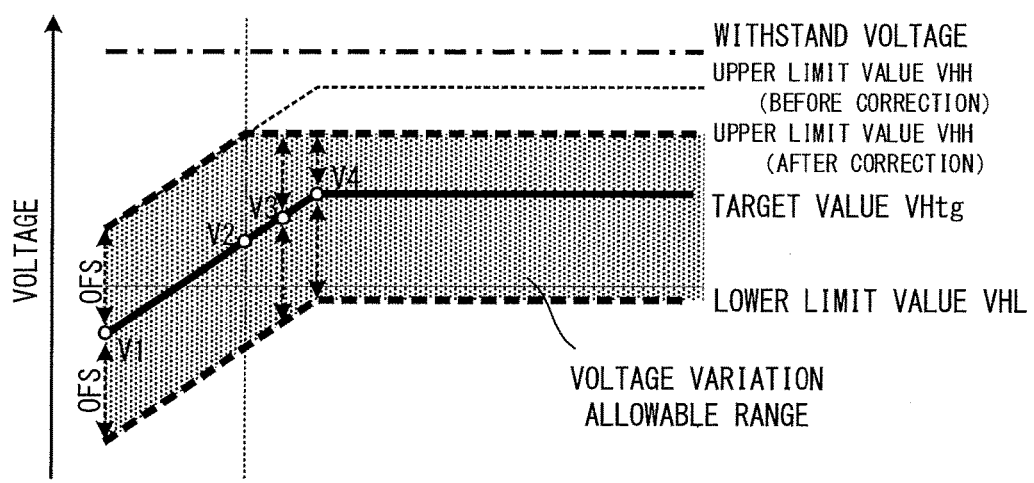
FIG. 11 is a diagram explaining a method of setting a voltage variation allowable range according to the second embodiment of the present invention.

Now, such a method of setting the voltage variation allowable range will be explained with reference to FIG. 11. FIG. 11 is a diagram explaining the method of setting the voltage variation allowable range.

FIG. 11 illustrates voltage on a vertical axis, and indicates a relation among the withstand voltage, the upper limit value VHH, the target value VHtg, and the lower limit value VHL. As illustrated, in a region in which the target value VHtg is from V1 to V2 (V2>V1), the voltage variation allowable range is symmetrical to the target value VHtg. In other words, a relation of "VHH−VHtg=VHtg−VHL=OFS" is satisfied.

On the other hand, if the voltage variation allowable range is not corrected, the upper limit value VHH set according to the target value VHtg approaches the withstand voltage, as illustrated by the "upper limit value VHH (before correction)". If the aforementioned overshoot occurs in this situation, the output voltage VH possibly exceeds the withstand voltage.

Thus, the upper limit value VHH according to the embodiment is limited in a range in which the target value VHtg is higher than V2, as illustrated by the "upper limit value VHH (after correction)". Specifically, in this range, the offset value OFS, which is a deviation between the upper limit value VHH and the target value VHtg, is reduced in a stepwise (or continuous) manner. For example, if the offset value when the target value VHtg is V3 is OFS1 and if the offset value when the target value VHtg is V4 (V4>V3) is OFS2, a relation of OFS>OFS1>OFS2 is satisfied.

Such a reduction correction of the offset value OFS may be executed to multiply the offset value OFS by a correction coefficient that is less than 1. In other words, in this case, the correction coefficient is reduced in a stepwise (or continuous) manner according to an increase in the target value VHtg. Alternatively, the reduction correction of the offset value OFS may be also executed to prepare in advance the offset values that decrease in a stepwise (or continuous) manner according to the increase in the target value VHtg, and to select the corresponding offset value according to the target value VHtg.

As described above, according to the embodiment, the voltage variation allowable range is asymmetric to the target value VHtg in a voltage range on a high voltage side to some extent. As a result, a deviation (or a margin) between the upper limit value VHH and the withstand voltage can be ensured to the extent that the output voltage VH does not exceed the withstand voltage even if the overshoot occurs. In other words, a correction amount of the upper limit value VHH (or a correction amount of the offset value) is set in such a manner that the deviation is sufficiently ensured, experimentally, experientially, or theoretically in advance. It is thus possible to execute the intermittent boosting as widely as possible while ensuring durability of the motor drive system 10, thereby further increasing a practical benefit associated with the reduction of the system loss Lsys.

The embodiment is configured in such a manner that the upper limit value VHH is corrected in the voltage range on the high voltage side to some extent (VHtg>V2); however, such a correction process may be performed over an entire region of the target value VHtg.

Moreover, here, such a configuration that the voltage variation allowable range is determined by the target value VHtg and the offset value as in the first embodiment will be explained. The same concept can be also applied to such a configuration that the voltage variation allowable range is set by the target value VHtg and a predetermined coefficient. In this case, the deviation between the target value VHtg and the upper limit value VHH or the lower limit value VHL is not uniform according to the target value VHtg, and thus the relation exemplified in FIG. 11 is not satisfied. It is however possible to easily apply the technical concept that the deviation between the upper limit value VHH and the target value VHtg is reduced on the high voltage side, in comparison with that before the correction.

<Third Embodiment>

Figure 12:
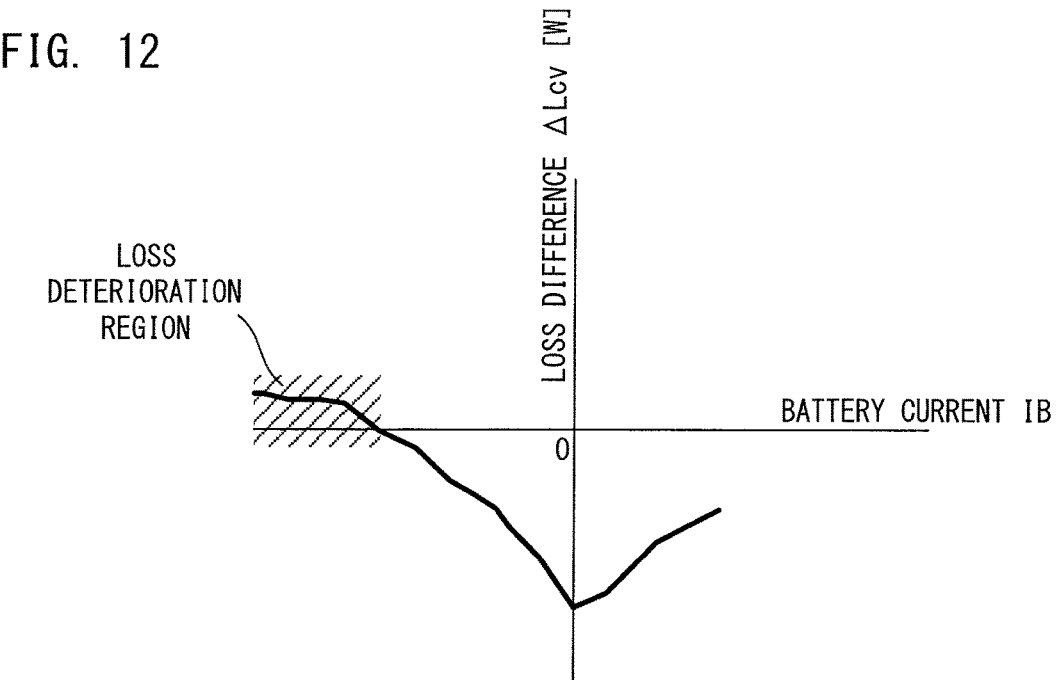
FIG. 12 is a flowchart illustrating intermittent control according to a third embodiment of the present invention.

In the intermittent control process in the first embodiment, the intermittent permission condition in the step S103 and the intermittent continuation condition in the step S104 include a condition which is related to the battery current IB. Now, with reference to FIG. 12, the significance of the battery current IB being used as a determination factor will be explained. FIG. 12 is a diagram explaining characteristics of a loss difference ΔLcv of the boost converter 200 with respect to the battery current IB. The loss difference ΔLcv means a difference with respect to the boost loss Lcv when the intermittent process of the boost control is not executed, i.e. when the output voltage VH is maintained at the target value VHtg. The loss difference ΔLcv having a positive value means deterioration of the loss and the loss difference ΔLcv having a negative value means a reduction in the loss.

Figure 13:
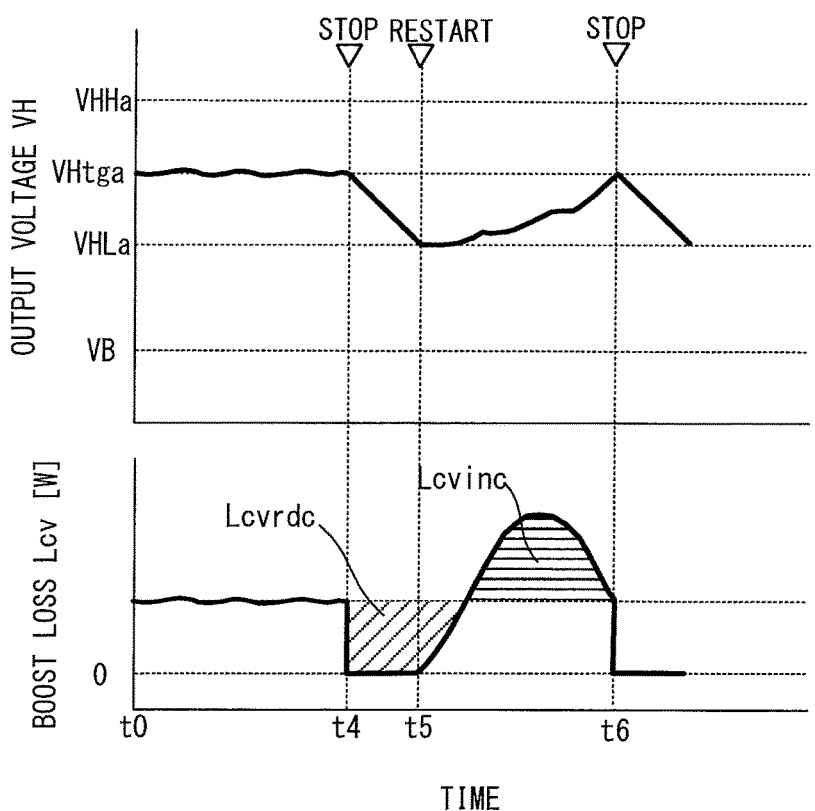
FIG. 13 is a diagram explaining characteristics of a loss difference ΔLcv of the boost converter with respect to the battery current IB.

FIG. 12 illustrates that the loss difference ΔLcv has a positive value (i.e. the boost loss Lcv deteriorates) in an illustrated loss deterioration region (refer to hatching) which corresponds to a condition that the battery current IB is large on the negative side. Now, the reason of the deterioration of the boost loss Lcv of the above described loss will be explained with reference to FIG. 13. FIG. 13 is a diagram illustrating a time transition of the output voltage VH and the boost loss Lcv during the execution of the intermittent control. In FIG. 13, the same parts as those in FIG. 6 will carry the same reference numerals, and the explanation thereof will be omitted as occasion demands.

FIG. 13 illustrates the case where the boost control is stopped from the state in which the output voltage VH is maintained at the target value VHtga, as in FIG. 6. However, it is assumed that the absolute value of the battery current IB is greater than that in the case of FIG. 6 and is a value in the loss deterioration region explained in FIG. 12.

In FIG. 13, when the boost control is stopped at a time point t4, electric power supplied to the motor generator MG is outputted from the capacitor C. The energy stored in the capacitor C is $\frac{1}{2} \cdot c \cdot (VH)^2$, wherein c is capacitance of the capacitor C. Thus, when the electric power is outputted from the capacitor C, the output voltage VH decreases. Here, if large current IB corresponding to the loss deterioration region flows, a decreasing speed of the output voltage VH increases, which reduces a time required until the output voltage VH reaches the lower limit value VHLa. As a result, at a time point t5, the output voltage VH reaches the lower limit value VHLa, and the boost control is restarted. Moreover, at a time point t6, the output voltage VH reaches the target value VHtga, and the boost control is stopped again.

Now, the total of the boost loss Lcv in the unit intermittent process described in the first embodiment (here, a process in a period from the time point t4 to the time point t6) will be calculated, by using the case where the output voltage VH is maintained at the target value VHtg as a reference (i.e. zero). The total of the loss is, as explained above, the difference between the loss decrease amount Lcvrdc (negative value) and the loss increase amount Lcvinc (positive value). The loss decrease amount Lcvrdc significantly decreases as the battery current IB increases, and the loss increase amount Lcvinc is not influenced so much by the battery current IB. As a result, the total of the loss is inclined to the positive side as the battery current IB increases, and the boost loss Lcv is increased in comparison with the reference. Namely, in this case, the intermittent process of the boost control further increases the boost loss Lcv.

As described above, the battery current IB is meaningful as the factor for determining whether or not to execute the intermittent process of the boost control. Therefore, high accuracy is required for the battery current IB detected by a current sensor, which constitutes the aforementioned various sensor groups. The current sensor, however, has a little or more temperature dependency, in addition to aged deterioration. Therefore, periodical calibration of the current sensor is required.

Here, in the embodiment, the calibration process of the current sensor is executed in the stop period of the boost control, in the execution period of the intermittent process of the boost control. In the stop period of the boost control, the boost converter 200 is stopped, and the battery current IB is thus zero in principle. Therefore, the calibration process of the sensor does not include uncertainties and allows an accurate calibration process.

Specifically, in one unit intermittent process (as described above, which may be a process from a stop time point of the boost control to a re-stop time point of the boost control, or may be a process from a start time point of the boost control to a restart time point of the boost control), for example, a predetermined number of times of sampling is executed from the stop time point of the boost control or a time point that is extremely short time after the stop time point. The averaging process is performed on the predetermined number of times of sampling values (or current values) to calculate a sensor offset amount. After the sensor offset amount is calculated, the detected battery current IB is corrected on the basis of the sensor offset amount after the next unit intermittent process. Here, it is configured such that the calibration process of the sensor is executed in one unit intermittent process; however, the calibration process of the sensor may be executed over a plurality of unit intermittent processes. In this manner, accidental detection errors can be removed, and more accurate calibration can be realized.

Here, in particular, in the intermittent process, the stop of the boot control is executed regardless of the necessity of the calibration process of the current sensor. Therefore, in such a configuration that the calibration process of the current sensor is executed in the stop period of the boost control, there is no need to make a state in which the battery current IB is zero for the calibration process, and the calibration process of the sensor can be executed, efficiently and effectively.

<Fourth Embodiment>

In the first to third embodiments, the example in which one motor generator MG is used as the loading apparatus according to the present invention is explained; however, the loading apparatus may be a plurality of motor generators. Here, the intermittent process of the boost control in a hybrid vehicle 1 which is provided with two motor generators as the loading apparatus will be explained.

<Configuration of Embodiment>

Figure 14:
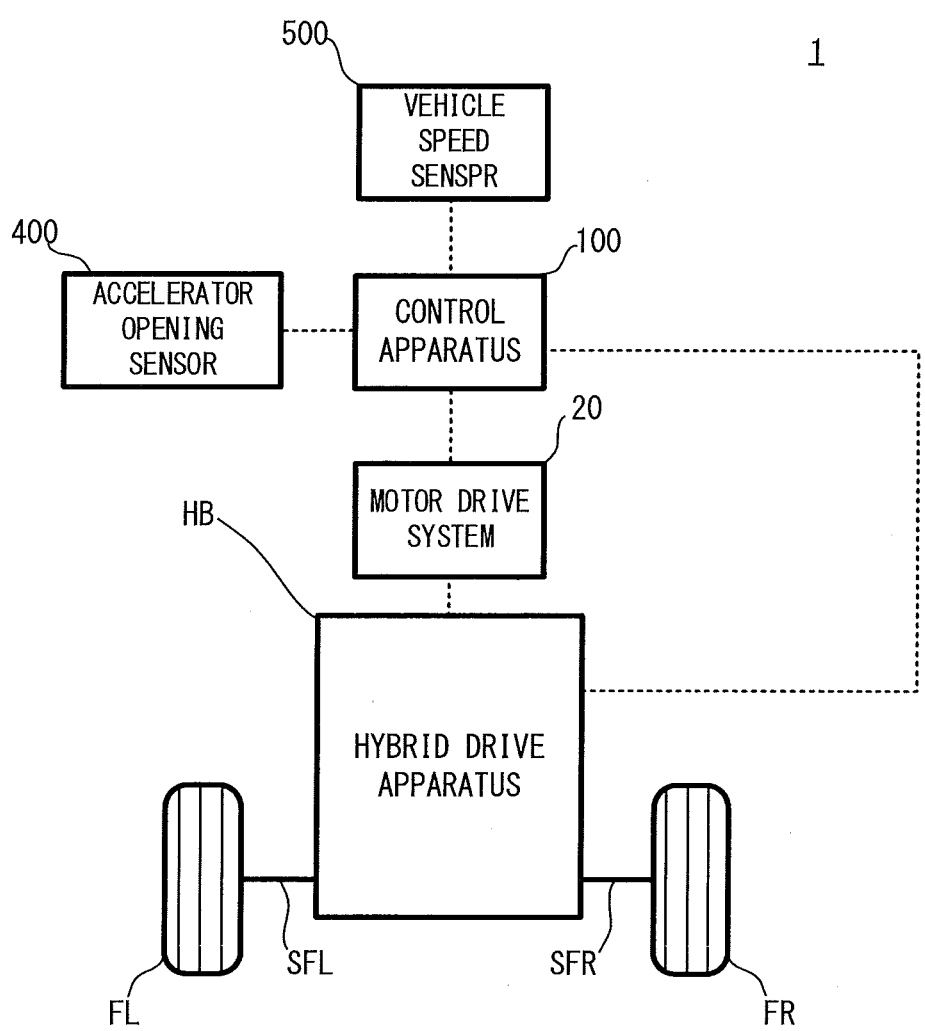
FIG. 14 is a schematic configuration diagram conceptually illustrating a configuration of a hybrid vehicle according to a fourth embodiment of the present invention.

Firstly, with reference to FIG. 14, a configuration of the hybrid vehicle 1 according to a fourth embodiment of the present invention will be explained. FIG. 14 is a schematic configuration diagram conceptually illustrating the configuration of the hybrid vehicle 1. In FIG. 14, the same parts as those in each of the figures described above will carry the same reference numerals, and the explanation thereof will be omitted as occasion demands.

In FIG. 14, the hybrid vehicle 1 is one example of the "vehicle" according to the present invention, which is provided with the control apparatus 100, a motor drive system 20, an accelerator opening sensor 400, a vehicle speed sensor 500, and a hybrid drive apparatus HB.

The hybrid drive apparatus HB is a drive unit which is configured to drive the hybrid vehicle 1 by supplying driving torque as a driving force to a left axle SFL (corresponding to a left front wheel FL) and a right axle SFR (corresponding to a right front wheel FR), each of which is an axle shaft of the hybrid vehicle 1. A detailed configuration of the hybrid drive apparatus HB will be described later.

The motor drive system 20 is another example of the "power supply system" according to the present invention, for driving a motor generator MG1 and a motor generator MG2 as the loading apparatus.

Figure 15:
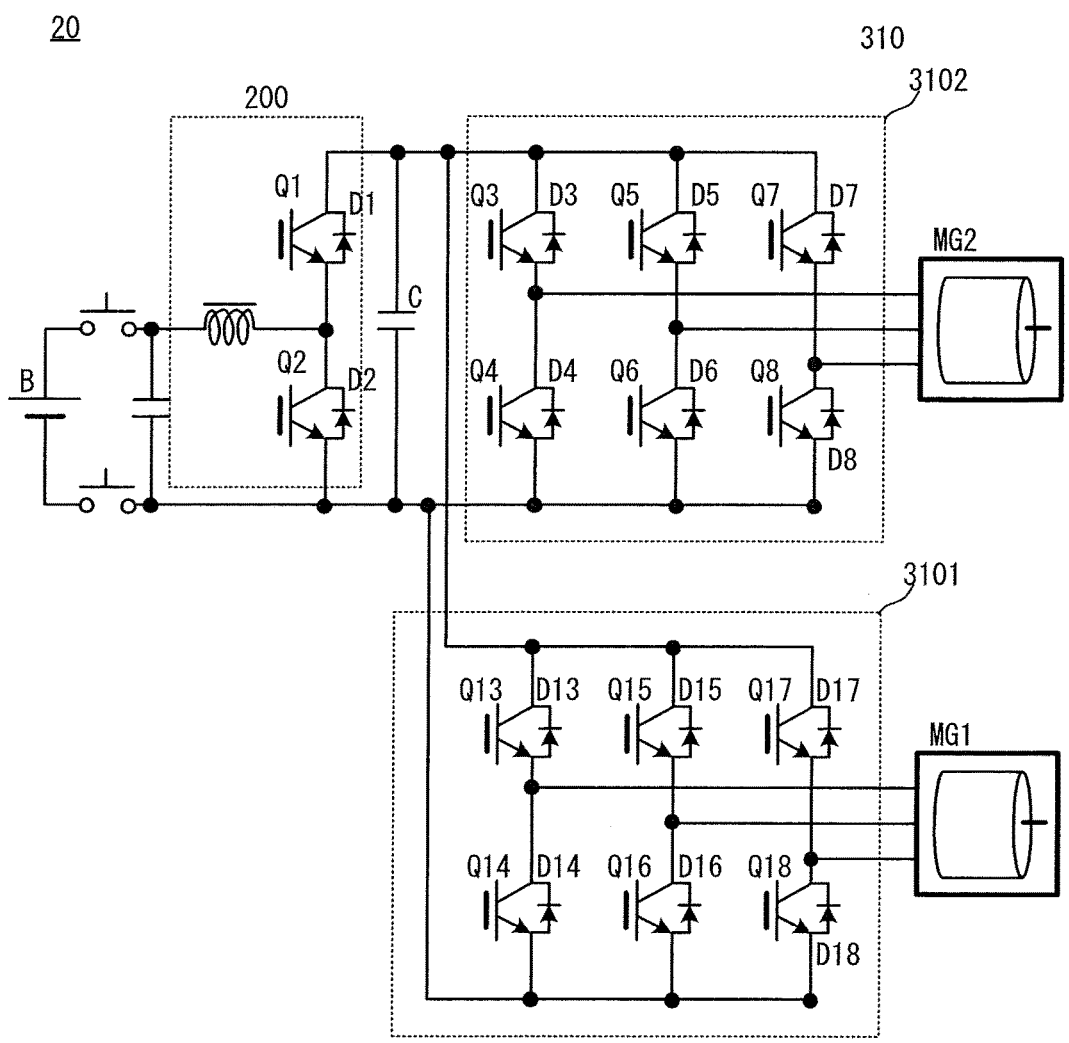
FIG. 15 is a system configuration diagram illustrating a motor drive system in the hybrid vehicle in FIG. 14.

Now, with reference to FIG. 15, a configuration of the motor drive system 20 will be explained. FIG. 15 is a system configuration diagram illustrating the motor drive system 20. In FIG. 15, the same parts as those in FIG. 1 will carry the same reference numerals, and the explanation thereof will be omitted as occasion demands.

In FIG. 15, the motor drive system 20 is different from the motor drive system 10 in the first to third embodiments in that it has an inverter 310 instead of the inverter 300. The inverter 310 is provided with a first inverter circuit 3101 which is configured to drive the motor generator MG1, and a second inverter circuit 3102 (i.e. an inverter circuit including p-side switching elements Q3, Q5, and Q7, and n-side switching elements Q4, Q6, and Q8) which has the same configuration as that of the inverter 300 according to each of the aforementioned embodiments and which is configured to drive the motor generator MG2 corresponding to the motor generator MG according to each of the aforementioned embodiments. The first inverter circuit 3101 is disposed electrically in parallel with the second inverter circuit 3102.

The first inverter circuit 3101 is provided with p-side switching elements Q13, Q15, and Q17 and n-side switching elements Q14, Q16, and Q18 for a u-phase, a v-phase, and a w-phase. The same applies to rectifying diodes.

Back in FIG. 14, the accelerator opening sensor 400 is a sensor which is configured to detect an accelerator opening degree Ta, which is a manipulated amount of a not-illustrated accelerator pedal of the hybrid vehicle 1. The accelerator opening sensor 400 is electrically connected to the control apparatus 100, and the detected accelerator opening degree Ta is referred to by the control apparatus 100 as occasion demands.

The vehicle speed sensor 500 is a sensor which is configured to detect a vehicle speed V of the hybrid vehicle 1. The vehicle speed sensor 500 is electrically connected to the control apparatus 100, and the detected vehicle speed V is referred to by the control apparatus 100 as occasion demands.

Figure 16:
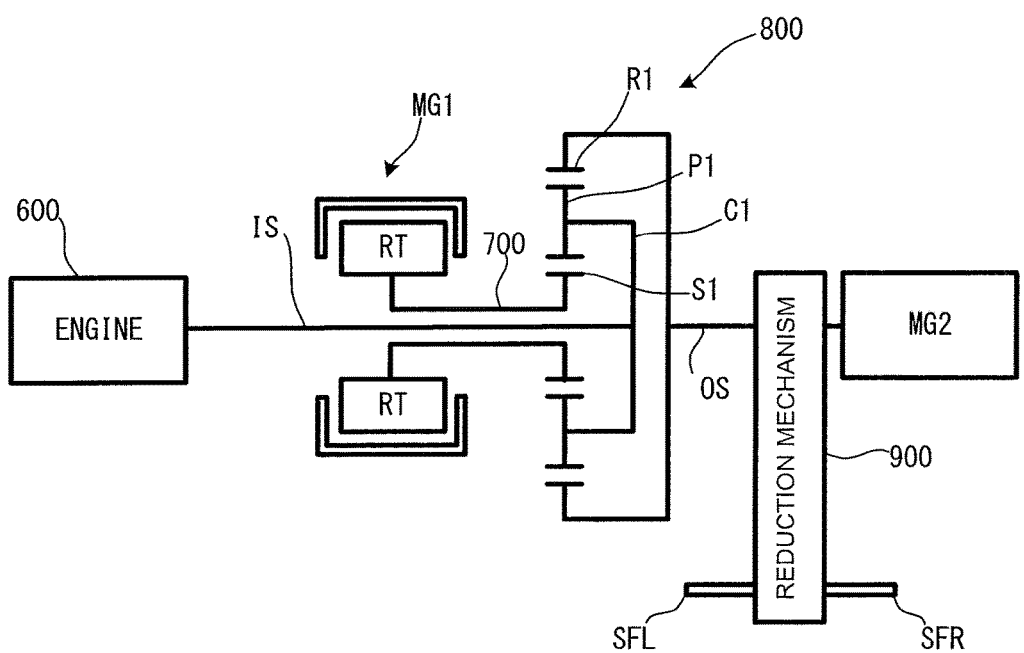
FIG. 16 is a schematic configuration diagram conceptually illustrating a hybrid drive apparatus in the hybrid vehicle in FIG. 14.

Next, with reference to FIG. 16, the detailed configuration of the hybrid drive apparatus HB will be explained. FIG. 16 is a schematic configuration diagram conceptually illustrating the configuration of the hybrid drive apparatus HB.

In FIG. 16, the hybrid drive apparatus HB is provided with an engine 600, an input shaft IS, a MG1 output shaft 700, a power dividing mechanism 800, a drive shaft OS, the motor generator MG1, the motor generator MG2, and a reduction mechanism 900.

Figure 17:
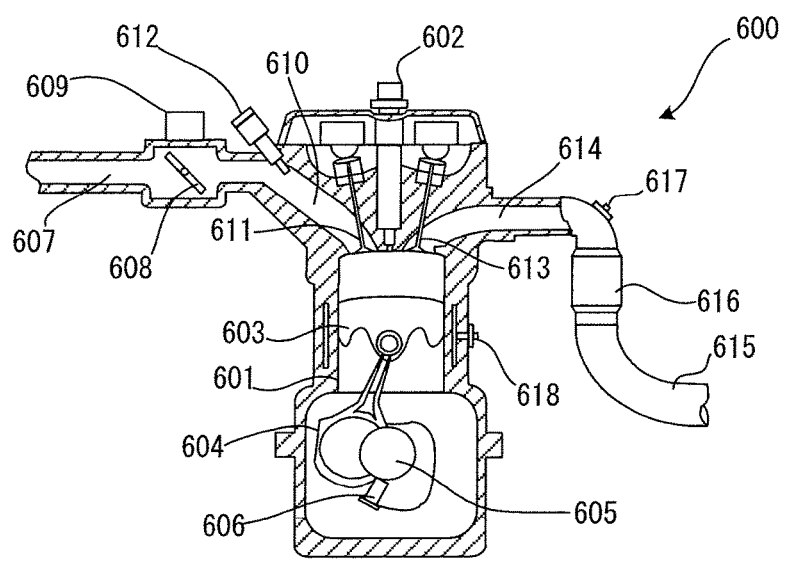
FIG. 17 is a schematic cross sectional view illustrating an engine of the hybrid vehicle in FIG. 16.

The engine 600 is a multi-cylinder gasoline engine, which is one example of the "engine" according to the present invention, and is configured to function as a main power source of the hybrid vehicle 1. Now, with reference to FIG. 17, a detailed configuration of the engine 600 will be explained. FIG. 17 is a schematic cross sectional view illustrating the configuration of the engine 600.

The "engine" of the present invention is a concept that includes an engine having at least one cylinder, the engine being configured to extract, within the cylinder, thermal energy generated during combustion of an air-fuel mixture including various fuels such as, for example, gasoline, light oil, and alcohol, as kinetic energy via a physical or mechanical transmitting device such as, for example, a piston, a connecting rod, and a crankshaft, as occasion demands. As long as the concept can be satisfied, the configuration of the engine according to the present invention is not limited to that of the engine 600 but may have various aspects.

In FIG. 17, the engine 600 is configured to enable the combustion of the air-fuel mixture via an ignition operation by an ignition apparatus 602 in which a part of a spark plug (whose reference numeral is omitted) is exposed in a combustion chamber within a cylinder 601, and to convert reciprocating motion of a piston 603 generated according to explosive force caused by the combustion into rotary motion of a crankshaft 605 via a connecting rod 604. In the vicinity of the crankshaft 605, there is disposed a crank position sensor 606 configured to detect a crank angle θcrk, which is a rotation angle of the crankshaft 605. The crank position sensor 606 is electrically connected to the control apparatus 100 (not illustrated), and the control apparatus 100 can calculate an engine rotational speed NE of the engine 600 on the basis of a crank angle signal outputted from the crank position sensor 606.

In the engine 600, an air sucked from the exterior passes through an intake tube 607, and is led into the cylinder 601 upon valve opening of an intake valve 611 via an intake port 610. On the other hand, a fuel injection valve of an injector 612 is exposed to the intake port 610, and is configured to inject the fuel to the intake port 610. The fuel injected from the injector 612 is mixed with an intake air before or after the valve opening timing of the intake valve 611 to make the aforementioned air-fuel mixture.

The fuel is stored in a not-illustrated fuel tank, and is supplied to the injector 612 via a not-illustrated delivery pipe by action of a not-illustrated feed pump. The air-fuel mixture burned within the cylinder 601 becomes an exhaust gas, and is led to an exhaust tube 615 via an exhaust port 614 upon valve opening of an exhaust valve 613, which opens and closes in conjunction with the opening and closing of the intake valve 611.

In the exhaust tube 615, there is disposed a three-way catalyst 616. The three-way catalyst 616 is a known exhaust gas purifying catalyst apparatus configured to purify the exhaust gas of the engine 600 by enabling an oxidation/combustion reaction of carbon monoxide (CO) and hydrocarbon (HC), which are emitted from the engine 600, and a reduction reaction of nitrogen oxide (NOx), which is also emitted from the engine 600, to proceed substantially simultaneously.

In the exhaust tube 615, there is disposed an air-fuel ratio sensor 617 configured to detect an exhaust gas air-fuel ratio of the engine 600. Moreover, in a water jacket disposed in a cylinder block for accommodating the cylinder 201, there is disposed a water temperature sensor 618 for detecting cooling water associated with cooling water (LLC), which is circulated and supplied for cooling the engine 600. The air-fuel ratio sensor 617 and the water temperature sensor 618 are respectively electrically connected to the control apparatus 100, and the detected air-fuel ratio and cooling water temperature are respectively referred to by the control apparatus 100 as occasion demands.

On the other hand, on an upstream side of the intake port 610 in the intake tube 607, there is disposed a throttle valve 608 configured to adjust an intake air amount associated with the intake air led via a not-illustrated cleaner. The throttle valve 608 is configured in such a manner that a drive state thereof is controlled by a throttle valve motor 609, which is electrically connected to the control apparatus 100. The control apparatus 100 controls the throttle valve motor 609 basically to obtain a throttle opening degree according to the opening degree of the not-illustrated accelerator pedal (i.e. the aforementioned accelerator opening degree Ta), but also can adjust the throttle opening degree without a driver's intention via operation control of the throttle valve motor 609. In other words, the throttle valve 608 is configured as a part of an electronically controlled throttle.

Back in FIG. 16, the motor generator MG1 is a motor generator as one example of the "first electrical rotating machine" according to the present invention, and is configured to include a power-running function for converting electric energy into kinetic energy and a regenerative function for converting kinetic energy into electric energy. The motor generator MG2 is a motor generator as one example of the "second electrical rotating machine" according to the present invention, and is configured to include the power running function for converting electric energy into kinetic energy and the regenerative function for converting kinetic energy into electric energy, as in the motor generator MG1. Each of the motor generators MG1 and MG2 is configured, for example, as a three-phase synchronous motor generator, and is provided with a rotor having a plurality of permanent magnets on an outer circumferential surface, and a stator around which a three-phase coil for forming a rotating magnetic field is wound. The motor generators, however, may have another configuration.

The power dividing mechanism 800 is a planetary gear mechanism with two rotational degrees of freedom, which is one example of the "differential mechanism" according to the present invention, and is provided with: a sun gear S1 disposed in a central part; a ring gear R1 concentrically disposed on an outer circumference of the sun gear S1; a plurality of pinion gears P1 disposed between the sun gear S1 and the ring gear R1, the pinion gears P1 revolving while rotating on the outer circumference of the sun gear S1; and a carrier C1 pivotally supporting rotating shafts of the respective pinion gears, wherein the sun gear S1 is one example of the "first rotating element" according to the present invention, the ring gear R1 is one example of the "third rotating element" according to the present invention, and the carrier C1 is one example of the "second rotating element" according to the present invention.

In the power dividing mechanism 800, the sun gear S1 is fixed to the MG1 output shaft 700 (coupled with a rotor RT of the motor generator MG1), which is an output shaft of the motor generator MG1, and a rotational speed of the sun gear S1 is equal to a MG1 rotational speed Nmg1, which is a rotational speed of the motor generator MG1. Moreover, the ring gear R1 is fixed to the drive shaft OS, and a rotational speed of the ring gear R1 is equal to an output rotational speed Nout, which is a rotational speed of the drive shaft OS. A rotor of the motor generator MG2 is fixed to the drive shaft OS, and the output rotational speed Nout is equal to a MG2 rotational speed Nmg2, which is a rotational speed of the motor generator MG2. The carrier C1 is coupled with the input shaft IS coupled with the crankshaft 605 of the engine 600, and a rotational speed of the carrier C1 is equal to the engine rotational speed NE of the engine 600. In the hybrid drive apparatus HB, each of the MG1 rotational speed Nmg1 and the MG2 rotational speed Nmg2 is detected by a rotation sensor, such as a resolver, with a regular period, and is transmitted to the control apparatus 100 with a regular or irregular period.

The drive shaft OS is coupled with drive shafts SFR and SFL (i.e. the drive shafts are one example of the "axle shaft" according to the present invention) that respectively drive the right front wheel FR and the left front wheel FL, which are drive wheels of the hybrid vehicle 1, via the reduction mechanism 900 as a reduction apparatus including various reduction gears such as a differential. Therefore, motor torque Tmg1 supplied to the drive shaft OS during the power running of the motor generator MG2 is transmitted to each of the drive shafts via the reduction mechanism 900, and is used as power for travel of the hybrid vehicle 1. On the other hand, a driving force inputted to the drive shaft OS via each of the drive shafts and the reduction mechanism 900 during the regeneration of the motor generator MG2 is used as power for power generation of the motor generator MG2. In this case, the motor torque Tmg1 of the motor generator MG2 is some type of regenerative torque, and magnitude thereof correlates with magnitude of regenerative power and magnitude of braking force (or regenerative braking force) applied to the drive wheels via the drive shaft OS. The MG2 rotational speed Nmg2 has a unique relation with the vehicle speed V of the hybrid vehicle 1.

In the hybrid drive apparatus HB, the power dividing mechanism 800 can distribute engine torque Te, which is supplied to the input shaft IS via the crankshaft 605 from the engine 600, to the sun gear S1 and the ring gear R1 by the carrier C1 and the pinion gears P1 at a predetermined ratio (or a ratio according to a gear ratio between the respective gears) and can divide the power of the engine 600 into two systems. More specifically, if, in order to make it easy to understand the operation of the power dividing mechanism 800, a gear ratio ρ is defined as the number of teeth of the sun gear S1 with respect to the number of teeth of the ring gear R1, then, when the engine torque Te acts on the carrier C1 from the engine 600, torque Tes that appears on the MG1 output shaft 700 is expressed by the following equation (1), and engine transmission torque Tep that appears on the drive shaft OS is expressed by the following equation (2).

$$Tes = Te \times \rho/(1+\rho) \tag{1}$$

$$Tep = Te \times 1/(1+\rho) \tag{2}$$

The configuration in the embodiment associated with the "differential mechanism" according to the present invention is not limited to the configuration exemplified as the power dividing mechanism 800. For example, the differential mechanism according to the present invention may be provided with a plurality of planetary gear mechanisms, and a plurality of rotating elements of one planetary gear mechanism may be respectively coupled with a plurality of rotating elements of another planetary gear mechanism to constitute an integral differential mechanism.

Moreover, the reduction mechanism 900 according to the embodiment merely reduces the rotational speed of the drive shaft OS in accordance with a reduction ratio set in advance; however, in addition to this type of reduction apparatus, the hybrid vehicle 1 may be provided with, for example, a stepped transmission apparatus provided with a plurality of shift gears including a plurality of clutch mechanisms and braking mechanisms as constituents.

<Operation of Embodiment>

<Operation of Power Dividing Mechanism 800>

Figure 18:
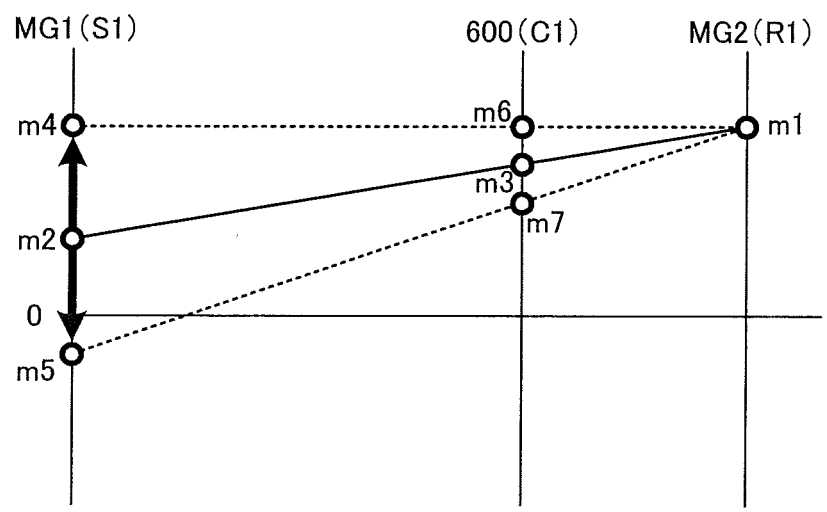
FIG. 18 is an operational nomogram of the hybrid drive apparatus in FIG. 16.

In the hybrid vehicle 1 according to the embodiment, a type of electric continuously variable transmission (CVT) function is realized by a differential action of the power dividing mechanism 800, which is a differential mechanism. Now, with reference to FIG. 18, the operation of the power dividing mechanism 800 will be explained. FIG. 18 is an operational nomogram of the hybrid drive apparatus HB. In FIG. 18, the same parts as those in FIG. 16 will carry the same reference numerals, and the explanation thereof will be omitted as occasion demands.

FIG. 18 illustrates a rotational speed on a vertical axis, and illustrates, from the left on a horizontal axis, the motor generator MG1 (or uniquely the sun gear S1), the engine 600 (or uniquely the carrier C1), and the motor generator MG2 (or uniquely the ring gear R1).

Here, the power dividing mechanism 800 is a planetary gear mechanism that performs a differential action with two rotational degrees of freedom between the rotating elements, and is configured in such a manner that if the rotational speeds of two elements of the sun gear S1, the carrier C1, and the ring gear R1 are determined, the rotational speed of the remaining one rotating element is necessarily determined. In other words, on the operational nomogram, an operating state of each rotating element can be expressed by one operational collinear line corresponding to one operating state of the hybrid drive apparatus HB in a one-to-one manner. Hereinafter, as occasion demands, a point on the operational nomogram will be expressed by an operating point mi (i is a natural number). In other words, one operating point mi corresponds to one rotational speed.

In FIG. 18, it is assumed that the operating point of the motor generator MG2 whose rotational speed has a unique relation with the vehicle speed V is an operating point m1. In this case, when the operating point of the motor generator MG1 is an operating point m2, the operating point of the engine 600 coupled with the carrier C1, which is the remaining one rotating element, is an operating point m3. At this time, for example, when the operating point of the motor generator MG1 is changed to an operating point m4 and an operating point m5 while maintaining the rotational speed of the drive shaft OS, the operating point of the engine 600 is respectively changed to an operating point m6 and an operating point m7.

In other words, in the hybrid drive apparatus HB, the motor generator MG1 is used as a rotational speed control apparatus, by which the engine 600 can be operated at a desired operating point. The operating point of the engine 600 (wherein the operating point in this case is defined by a combination of the engine rotational speed NE and the engine torque Te) is controlled basically to an optimum fuel consumption operating point at which the engine 600 has a minimum fuel consumption rate.

Further to the above, in the power dividing mechanism 800, in order to supply the drive shaft OS with the engine transmission torque Tep corresponding to the engine torque Te described above, it is necessary to supply reaction torque having the same magnitude as that of the aforementioned torque Tes that appears according to the engine torque Te and having an inverted sign (which is, namely, negative torque) from the motor generator MG1 to the MG1 output shaft 700. In this case, at operating points in a positive rotation region such as the operating point m2 or the operating point m4, the MG1 is in the regenerative state with positive rotation and negative torque. In other words, in the hybrid drive apparatus HB, the motor generator MG1 is allowed to function as a reaction element, by which power generation can be performed while a part of the engine torque Te is supplied to the drive shaft OS. If the engine transmission torque Tep is insufficient for drive shaft required torque Tpn, which is torque required for the drive shaft OS, motor torque Tmg2 is supplied to the drive shaft OS from the motor generator MG2, as occasion demands.

<Intermittent Control in Power Circulation>

Figure 19:
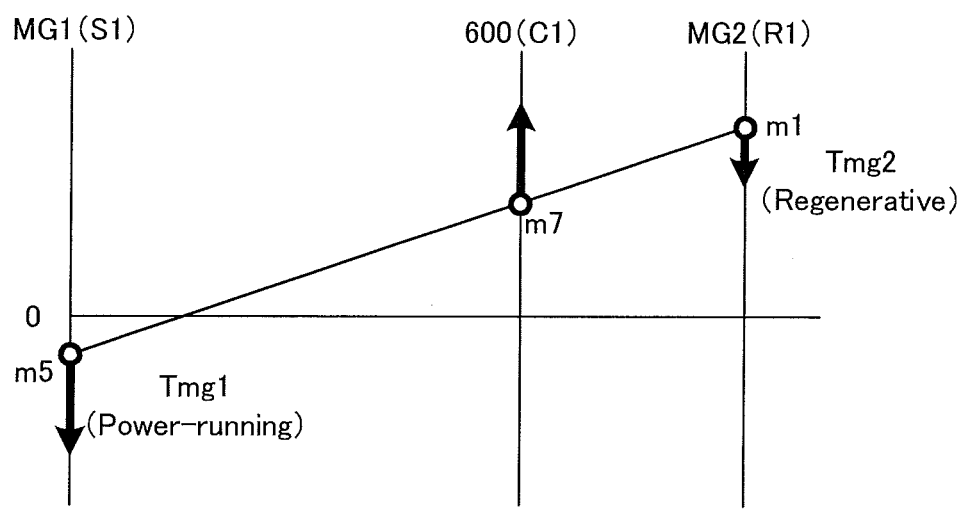
FIG. 19 is an operational nomogram during power circulation of the hybrid drive apparatus in FIG. 16.

In the hybrid drive apparatus HB which performs the basic operation as described above, power circulation can occur in a case where the hybrid vehicle 1 travels in a high-speed and low-load manner or in similar cases. Now, with reference to FIG. 19, the power circulation of the hybrid drive apparatus HB will be explained. FIG. 19 is an operational nomogram during the power circulation of the hybrid drive apparatus HB. In FIG. 19, the same parts as those in FIG. 18 will carry the same reference numerals, and the explanation thereof will be omitted as occasion demands.

In FIG. 19, in order to represents the high-speed and low-load travel in which the drive shaft required torque Tpm can be satisfied only by the engine transmission torque Tep in a high vehicle speed region, it is assumed that the operating points of the motor generator MG2 and the engine 600 are respectively the operating points m1 and m7 illustrated.

In this case, the operating point of the motor generator MG1, which is uniquely determined, is the operating point m5, and the rotational speed (or the MG1 rotational speed Nmg1) has a value in a negative rotation region. On the other hand, the motor generator MG1 is a reaction element for supplying the engine transmission torque Tep to the drive shaft OS, and the output torque thereof, i.e. the MG1 torque Tmg1, is negative torque. Namely, in such a situation, the motor generator MG1 is in a negative-rotation, negative-torque state, and is in the power-running state as the operating state.

When the motor generator MG1 is in the power-running state, the MG1 torque Tmg1 appears as drive torque on the drive shaft OS, and thus, drive torque supplied to the drive shaft OS becomes greater than the drive shaft required torque Tpn. Therefore, a part of the excessive drive torque is used by the motor generator MG2. Namely, in this case, the motor generator MG2 is in the regenerative state with positive rotation and negative torque. Therefore, in this state, a type of electrical path is generated between the motor generator MG2 and the motor generator MG1. This state is a power circulation state. In the hybrid drive apparatus HB in the power circulation state, the regenerative power of the motor generator MG2 is consumed by the power running of the motor generator MG1.

Figure 20:
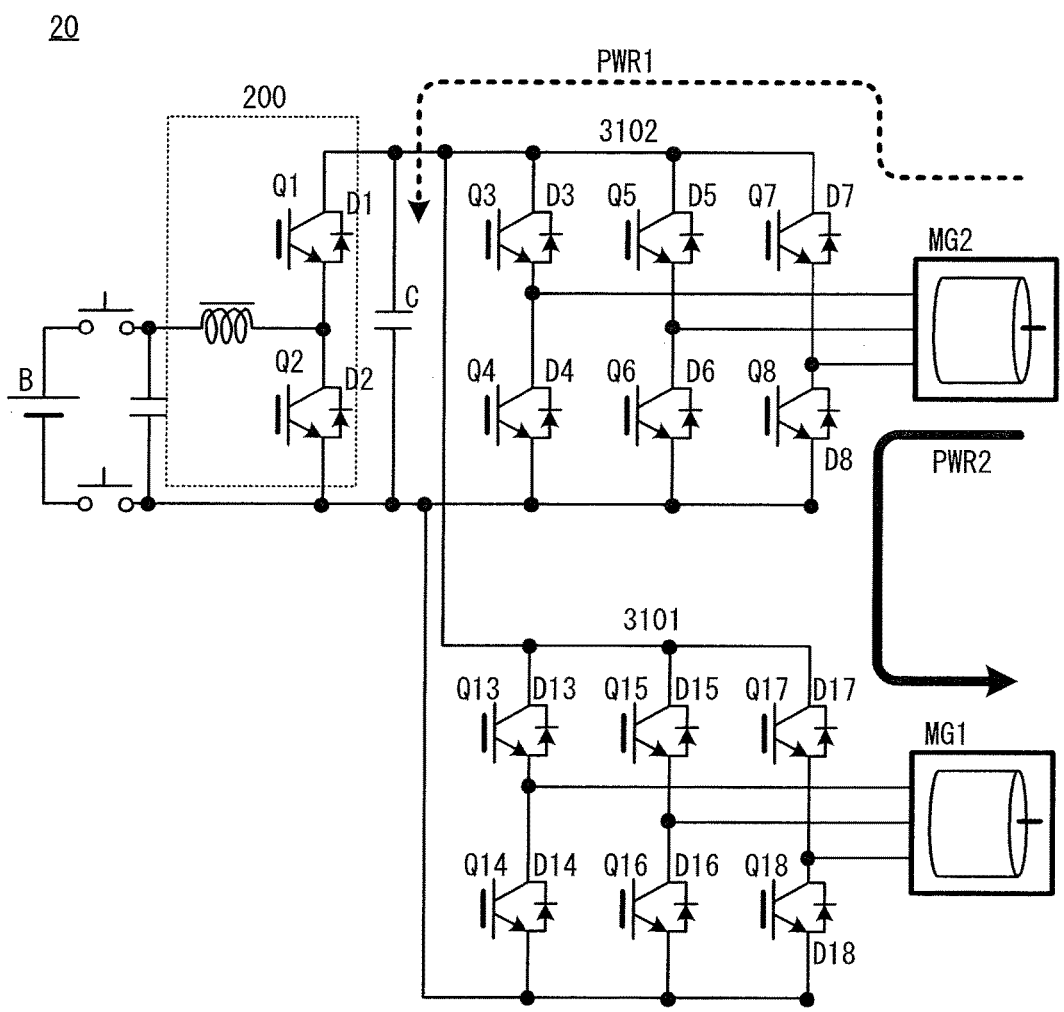
FIG. 20 is a diagram explaining an electrical path during power circulation of the motor drive system according to the fourth embodiment.

Now, with reference to FIG. 20, the electrical path of the motor drive system 20 in the power circulation state will be explained. FIG. 20 is a diagram explaining the electrical path during the power circulation of the motor drive system 20. In FIG. 20, the same parts as those in FIG. 15 will carry the same reference numerals, and the explanation thereof will be omitted as occasion demands.

In FIG. 20, during the power circulation, a most part of the regenerative power generated in the motor generator MG2 is consumed by the power running of the motor generator MG1 (refer to illustrated PWR2 (solid line)). Moreover, a part of the regenerative power that is not consumed by the power running of the motor generator MG1 is supplied to the capacitor C (refer to illustrated PWR1 (dashed line)).

As illustrated in FIG. 20, during the power circulation, the power supply to the capacitor C is reduced, and the output voltage VH of the boost converter 200 when the boost control is stopped varies extremely slowly. Therefore, during the power circulation, various intermittent controls explained in the first to third embodiments function extremely effectively.

The present invention is not limited to the aforementioned embodiments, but various changes may be made, if desired, without departing from the essence or spirit of the invention which can be read from the claims and the entire specification. A boost converter control apparatus which involves such changes is also intended to be within the technical scope of the present invention.

INDUSTRIAL APPLICABILITY

The present invention can be applied to the control of the boost converter in the system in which the power supply voltage is boosted by the boost converter to drive the loading apparatus.

DESCRIPTION OF REFERENCE NUMERALS AND LETTERS 10 motor drive system
100 control apparatus
110 boost control unit
120 inverter control unit
200 boost converter
300 inverter
C capacitor
B direct current power supply
MG, MG1, MG2 motor generator

The invention claimed is:

1. A boost converter control apparatus which is configured to control a boost converter in a power supply system,
the power supply system comprising:
a DC (direct current) power supply having power supply voltage (VB);
the boost converter including a switching device, the boost converter being configured to boost the power supply voltage and output the boosted power supply voltage to a loading apparatus by predetermined boost control including switching of a switching state of the switching device; and
a voltage sensor which is configured to detect output voltage (VH) of the boost converter,
the boost converter control apparatus comprising:
a target value setting device that is configured to set a target value (VHtg) of the output voltage such that a loss of the power supply system (Lsys) including the DC power supply, the boost converter, and the loading apparatus is minimum;
an intermittent controlling device that is configured to execute repeatedly an intermittent process of the boost control such that the output voltage is maintained in a voltage variation allowable range including the target value (VHtg) which is set in an immediately preceding execution of the boost control based on the detected output voltage;
an average value calculating device that is configured to calculate an average value (VHavg) of the output voltage which is obtained by averaging a plurality of the detected output voltage in the execution period of the intermittent process of the boost control; and
a target value correcting device that is configured to correct the set target value (VHtg) to reduce a deviation between the calculated average value (VHavg) of the output voltage and the set target value (VHtg) of the output voltage.

2. The boost converter control apparatus according to claim 1, wherein the boost converter control apparatus further comprising a range setting device that is configured to set the voltage variation allowable range in such a manner that a deviation between the set or corrected target value and an upper limit value of the voltage variation allowable range decreases as the set or corrected target value increases.

3. The boost converter control apparatus according to claim 1, wherein the average value calculating device that is configured to calculate the average value on the basis of the detected output voltage in at least one unit intermittent process, wherein the unit intermittent process is a process corresponding to a period including an execution period and a stop period of the boost control, which are continuous to each other, in the intermittent process of the boost control is.

4. The boost converter control apparatus according to claim 3, wherein
the power supply system further comprises a current sensor which is configured to detect current which flows through the DC power supply or the boost converter, and
the boost converter control apparatus further comprises a current correcting device that is configured to correct the detected current in the stop period of the boost control in the one unit intermittent process.

5. The boost converter control apparatus according to claim 1, wherein the target value setting device that is configured to (1) correct the set target value by adding a value that is less than or equal to the deviation between the calculated average value and the set target value to the set target value when the average value which is previously calculated by the target value setting device is less than the set target value, and (2) correct the set target value by subtracting the value that is less than or equal to the deviation between the calculated average value and the set target value from the set target value when the average value which is previously calculated by the target value setting device is greater than the set target value.

6. The boost converter control apparatus according to claim 1, wherein the intermittent controlling device that is configured to start the intermittent process of the boost control when a variation width of the output voltage is within a predetermined value.

7. The boost converter control apparatus according to claim 1, wherein the power supply system is mounted on a vehicle.

8. The boost converter control apparatus according to claim 7, wherein the vehicle comprises, as a power source of the vehicle, at least one electrical rotating machine which is capable of performing power running and regeneration and which is the loading apparatus.

9. The boost converter control apparatus according to claim 8, wherein
the vehicle is a hybrid vehicle comprising:
an engine;
a first electrical rotating machine which is capable of performing the power running and the regeneration and which is the loading apparatus;
a differential mechanism comprising a plurality of rotating elements that can differentially rotate with each other, the plurality of rotating elements including a first rotating element which is coupled with the first electrical rotating machine, a second rotating element which is coupled with the engine, and a third rotating element which is coupled with a drive shaft connected to an axle shaft; and a second electrical rotating machine which is coupled with the drive shaft, which is capable of performing the power running and the regeneration and which is the loading apparatus, and the intermittent controlling device that is configured to start the intermittent process of the boost control when a difference between an input/output of power from/to the first and second electrical rotating machines is within a predetermined value in a case where one of the first and second electrical rotating machines is in a power-running state and the other is in a regenerative state.

* * * * *